US009883098B2

(12) United States Patent
Park et al.

(10) Patent No.: US 9,883,098 B2
(45) Date of Patent: Jan. 30, 2018

(54) APPARATUS AND METHOD FOR CONTROLLING AUTO FOCUS OF CAMERA MODULE

(71) Applicant: LG ELECTRONICS INC., Seoul (KR)

(72) Inventors: Haejin Park, Seoul (KR); Sungdu Kwon, Seoul (KR); Youngman Kwon, Seoul (KR); Jayong Lee, Seoul (KR); Taegil Cho, Seoul (KR); Salkmann Ji, Seoul (KR); Samnyol Hong, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/455,018

(22) Filed: Mar. 9, 2017

(65) Prior Publication Data
US 2017/0264813 A1 Sep. 14, 2017

(30) Foreign Application Priority Data

Mar. 9, 2016 (KR) .................. 10-2016-0028174
Sep. 13, 2016 (KR) .................. 10-2016-0117824

(51) Int. Cl.
*H04N 5/228* (2006.01)
*G03B 13/34* (2006.01)
(Continued)

(52) U.S. Cl.
CPC ........... *H04N 5/23212* (2013.01); *G02B 7/28* (2013.01); *G05D 3/14* (2013.01); *H02P 7/025* (2016.02);
(Continued)

(58) Field of Classification Search
CPC ........... H04N 5/23212; H04N 5/23264; H04N 5/23245; H04N 5/23287; G01J 5/0265;
(Continued)

(56) References Cited

U.S. PATENT DOCUMENTS 6,154,611 A   11/2000  Washisu
7,620,305 B2 *  11/2009  Noji .................... H04N 5/23248
                                                 348/208.99

(Continued)

FOREIGN PATENT DOCUMENTS

CN        101236285       8/2008
JP         59231745     12/1984
(Continued)

OTHER PUBLICATIONS

European Patent Office Application Serial No. 15740339.5, Search Report dated May 26, 2017, 14 pages.

(Continued)

*Primary Examiner* — Trung Diep
(74) *Attorney, Agent, or Firm* — Lee Hong Degerman Kang & Waimey

(57) ABSTRACT

Disclosed are an apparatus and method for controlling auto focus of a camera module. The present invention includes a lens unit, a moving coil, a fixed coil, and a controller configured to provide a signal comprising first frequency signal and second frequency signal to the moving coil, the fixed coil receiving the variable current or the variable voltage through the second frequency signal, calculate a focus position value based on the received variable current or the variable voltage and an image signal, and control the lens unit to move by applying the first frequency signal to the moving coil according to the calculated focus position value, wherein the controller is further configured to detect a temperature change of the fixed coil and to correct a focus (Continued)

position of the lens unit corresponding to the detected temperature change of the fixed coil.

21 Claims, 16 Drawing Sheets

(51) Int. Cl.
| | |
|---|---|
| *H04N 5/232* | (2006.01) |
| *G02B 7/28* | (2006.01) |
| *H02P 7/025* | (2016.01) |
| *H02P 29/64* | (2016.01) |
| *G05D 3/14* | (2006.01) |

(52) U.S. Cl.
CPC .......... *H02P 29/64* (2016.02); *H02P 2203/00* (2013.01)

(58) Field of Classification Search
CPC .... G02B 27/0176; G02B 7/028; G02B 7/102; G02B 27/646; G03B 2205/0053; G03B 2217/005; G03B 13/36; G03B 13/32; G03B 13/34
USPC .............. 348/208.1–208.11; 396/75, 133
See application file for complete search history.

(56) References Cited

U.S. PATENT DOCUMENTS

| | | | |
|---|---|---|---|
| 7,684,685 B2 * | 3/2010 | Takahashi | G02B 27/646 348/208.11 |
| 7,925,148 B2 * | 4/2011 | Choi | G03B 13/32 348/345 |
| 8,190,014 B2 * | 5/2012 | Tsuda | G02B 7/38 396/133 |
| 8,531,534 B2 | 9/2013 | Hu et al. | |
| 8,743,218 B2 | 6/2014 | Tsuchida | |
| 8,896,749 B2 | 11/2014 | Kudo | |
| 9,134,503 B2 | 9/2015 | Topliss | |
| 9,423,631 B2 | 8/2016 | Cho et al. | |
| 2003/0081137 A1 | 5/2003 | Yamazaki | |
| 2004/0174614 A1 * | 9/2004 | Hovanky | G02B 7/102 359/694 |
| 2005/0265705 A1 | 12/2005 | Uenaka | |
| 2007/0159010 A1 | 7/2007 | Su et al. | |
| 2007/0285522 A1 | 12/2007 | Kimura | |
| 2008/0297922 A1 | 12/2008 | Lule | |
| 2009/0003818 A1 | 1/2009 | Park et al. | |
| 2009/0022487 A1 | 1/2009 | Weng et al. | |
| 2010/0033616 A1 | 2/2010 | Huang et al. | |
| 2010/0060774 A1 | 3/2010 | Azuma et al. | |
| 2010/0142937 A1 | 6/2010 | Chen et al. | |
| 2011/0122268 A1 | 5/2011 | Okamoto et al. | |
| 2011/0261248 A1 * | 10/2011 | Matsuda | H04N 5/23212 348/340 |
| 2011/0286099 A1 | 11/2011 | Shiraki et al. | |
| 2012/0081559 A1 | 4/2012 | Sato | |
| 2012/0092768 A1 | 4/2012 | Shiraki et al. | |
| 2012/0120492 A1 | 5/2012 | Sato | |
| 2013/0215511 A1 | 8/2013 | Wu et al. | |
| 2013/0215525 A1 | 8/2013 | Wang et al. | |
| 2014/0009631 A1 | 1/2014 | Topliss | |
| 2014/0098421 A1 | 4/2014 | Umezu | |
| 2014/0118601 A1 | 5/2014 | Myung | |
| 2015/0207983 A1 | 7/2015 | Kang et al. | |
| 2015/0365568 A1 | 12/2015 | Topliss et al. | |

FOREIGN PATENT DOCUMENTS

| | | |
|---|---|---|
| JP | 60049309 | 3/1985 |
| JP | H01206861 | 8/1989 |
| JP | 05196983 | 8/1993 |
| JP | 09033792 | 2/1997 |
| JP | 2000295831 | 10/2000 |
| JP | 2009271204 | 11/2009 |
| JP | 2010164638 | 7/2010 |
| JP | 2010204429 | 9/2010 |
| JP | 2012088477 | 5/2012 |
| JP | 2012128390 | 7/2012 |
| JP | 2012177754 | 9/2012 |
| KR | 1020080006722 | 1/2008 |
| KR | 1020100039925 | 4/2010 |
| KR | 1020120117236 | 10/2012 |
| KR | 1020130029631 | 3/2013 |
| KR | 1020130071000 | 6/2013 |
| KR | 1020150080710 | 7/2015 |
| KR | 1020150097998 | 8/2015 |
| KR | 1020160020692 | 2/2016 |
| WO | 2015111884 | 7/2015 |

OTHER PUBLICATIONS

PCT International Application No. PCT/KR2015/000513, Written Opinion of the International Searching Authority dated Apr. 30, 2015, 7 pages.
U.S. Appl. No. 14/601,850, Notice of Allowance dated Aug. 12, 2016, 8 pages.
State Intellectual Property Office of the People's Republic of China Application Serial No. 201580000181.0, Office Action dated Mar. 29, 2017, 21 pages.
U.S. Appl. No. 15/455,040, Final Office Action dated May 15, 2017, 13 pages.
U.S. Appl. No. 15/591,393, Notice of Allowance dated Jun. 23, 2017, 10 pages.
U.S. Appl. No. 15/455,060, Notice of Allowance dated Jul. 6, 2017, 9 pages.
PCT International Application No. PCT/KR2017/002591, Notification of Transmittal of the International Search Report and the Written Opinion of the International Searching Authority, or Declaration dated Aug. 7, 2017, 16 pages.
PCT International Application No. PCT/KR2017/004720, Notification of Transmittal of the International Search Report and the Written Opinion of the International Searching Authority, or Declaration dated Aug. 8, 2017, 11 pages.
European Patent Office Application Serial No. 17170156.8, Search Report dated Sep. 19, 2017, 10 pages.

\* cited by examiner

APPARATUS AND METHOD FOR CONTROLLING AUTO FOCUS OF CAMERA MODULE

Pursuant to 35 U.S.C. §119(a), this application claims the benefit of earlier filing date and right of priority to Korean Patent Application Nos. 10-2016-0028174, filed Mar. 9, 2016 and 10-2016-0117824, filed on Sep. 13, 2016, the contents of which are all hereby incorporated by reference herein in their entirety.

BACKGROUND OF THE INVENTION

Field of the Invention

The present invention relates to a camera module, and more particularly, to an apparatus and method for controlling auto focus of a camera module including a voice coil motor actuator.

Discussion of the Related Art

Owing to the recent technical developments, multi-functional mobile terminals having various functions intensively integrated therein are released and mobile terminals tend to be downsized and lightened to fit the mobile environments despite functional complexity and diversity.

Therefore, a camera module installed in a mobile terminal such as a mobile phone, a laptop or the like tends to be downsized owing to the ultra-downsizing and ultra-precision of lenses.

An optical system of a camera module needs an auto-focus function to have a clear view of a target object that becomes a subject.

Such an auto-focus function uses actuators of various types in order to move a lens module to an optical focal position. And, performance of an auto-focus of a camera module can vary according to property of an actuator configured to transport a lens module.

Auto-focus actuators can include actuators of various types such as a voice coil motor (VCM) actuator, a piezo-electrically driven actuator, an MEMs actuator driven by static capacitance and the like.

With respect to a camera module that employs a voice coil motor actuator, permanent magnet is located at a fixing part of the camera module and a coil is attached to a lens module to be driven, whereby a magnetic circuit is configured. Hence, a lens module is driven by Lorenz Force that flows through the coil.

Thus, the camera module of the voice coil motor type uses a scheme of obtaining a position of a lens module in a manner of applying a drive signal to a coil and then sensing an induced current through a coil sensor. Since the camera module does not use such parts as a hole sensor, magnet and the like comparison with an existing hole sensor applied technology, it is advantageous in material cost reduction, manufacturing process simplification and product downsizing.

However, regarding the camera module of the voice coil type, when a sensing signal for sensing a moving position of a lens module is received, since noise is generated due to effects of an OIS (optical image stabilizer) signal, a drive signal for a movement of the lens module and the like, it causes a problem that the moving position of the lens module cannot be sensed accurately.

Thus, the camera module has a problem that an accurate position of the lens module cannot be accurately measured due to the noise generated from the sensing signal.

SUMMARY OF THE INVENTION

Accordingly, embodiments of the present invention are directed to an apparatus and method for controlling auto focus of a camera module that substantially obviate one or more problems due to limitations and disadvantages of the related art.

One object of the present invention is to provide an apparatus and method for controlling auto focus of a camera module, by which malfunction of an auto focus due to a temperature change of a sensing unit is prevented in a manner of correcting a focus position of a lens unit by detecting a temperature change of the sensing unit.

Another object of the present invention is to provide an apparatus and method for controlling auto focus of a camera module, by correcting the location of the lens unit according to a frequent temperature change of the sensing unit due to the movement of the lens unit.

Further object of the present invention is to provide an apparatus and method for controlling auto focus of a camera module, by which auto focus error prevention and auto focus time reduction can be achieved in a manner of reducing natural oscillation of a spring by disposing a damper between the spring and a lens unit.

Technical tasks obtainable from the present invention are non-limited by the above-mentioned technical tasks. And, other unmentioned technical tasks can be clearly understood from the following description by those having ordinary skill in the technical field to which the present invention pertains.

Additional advantages, objects, and features of the invention will be set forth in the disclosure herein as well as the accompanying drawings. Such aspects may also be appreciated by those skilled in the art based on the disclosure herein.

To achieve these objects and other advantages and in accordance with the purpose of the invention, as embodied and broadly described herein, an apparatus for controlling an auto focus of a camera module according to one embodiment of the present invention may include a fixed unit having a perforated hole formed therein, a magnet placed inside the fixed unit, a lens unit including at least one lens and configured to linearly move inside the perforated hole of the fixed unit, a moving coil placed on a surface of the lens unit, a fixed coil receiving from the moving coil, a variable current or a variable voltage according to a distance moved by the moving coil, an image signal processing unit processing an image signal sensed by the sensing unit, and a controller configured to provide a signal comprising first frequency signal and second frequency signal to the moving coil, wherein the fixed coil receiving the variable current or the variable voltage through the second frequency signal, calculate a focus position value based on the received variable current or the variable voltage according to a distance moved by the moving coil from the fixed coil and the image signal processed by the image signal processing unit, and control the lens unit to move by applying the first frequency signal to the moving coil according to the calculated focus position value, wherein the controller is further configured to detect a temperature change of the fixed coil and to correct a focus position of the lens unit corresponding to the detected temperature change of the fixed coil.

In another aspect of the present invention, as embodied and broadly described herein, a method of controlling an auto focus of a camera module according to another embodiment of the present invention may include generating a drive signal by synthesizing a first frequency signal and a second frequency signal, moving the lens unit by applying the synthesized drive signal to the moving coil, sensing an image incident on the lens unit according to the movement of the lens unit, processing the sensed image signal, measuring a current position of the moved lens unit, verifying whether measured current position is a focus position, detecting a temperature change of the fixed coil if the current position of the lens unit is the focus position, and correcting the focus position of the lens unit according to the detected temperature change of the fixed coil.

In another aspect of the present invention, as embodied and broadly described herein, a method of controlling an auto focus of a camera module according to another embodiment of the present invention may include generating a drive signal by synthesizing a first frequency signal and a second frequency signal, moving the lens unit by applying the synthesized drive signal to the moving coil, sensing an image incident on the lens unit according to the movement of the lens unit, processing the sensed image signal, measuring a current position of the moved lens unit, detecting a temperature change of the sensing unit, correcting the current position of the lens unit according to the detected temperature change of the sensing unit, verifying whether the current position is a focus position, and if the current position of the lens unit is the focus position, terminating a movement of the lens unit.

Effects obtainable from the present invention may be non-limited by the above mentioned effect. And, other unmentioned effects can be clearly understood from the following description by those having ordinary skill in the technical field to which the present invention pertains.

It is to be understood that both the foregoing general description and the following detailed description of the present invention are exemplary and explanatory and are intended to provide further explanation of the invention as claimed.

BRIEF DESCRIPTION OF THE DRAWINGS

Arrangements and embodiments may be described in detail with reference to the following drawings in which like reference numerals refer to like elements and wherein.

DETAILED DESCRIPTION OF THE INVENTION

Figure 1:
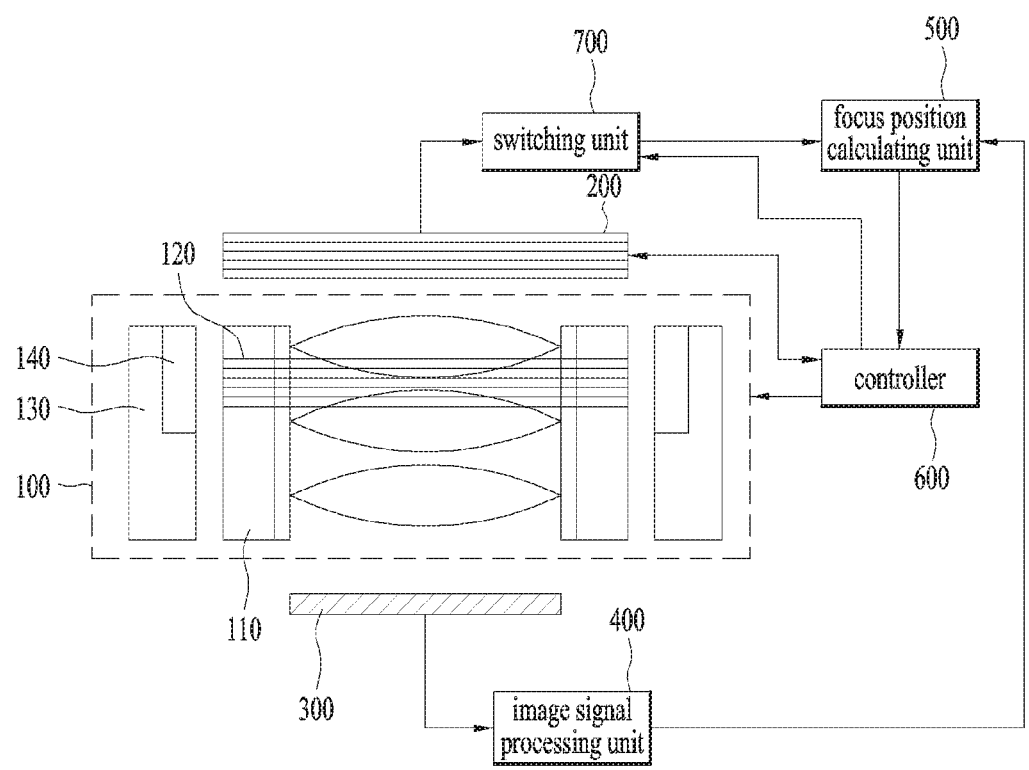
FIG. 1 and FIG. 2 are block diagrams to illustrate an auto focus control device of a camera module according to one embodiment of the present invention.

Reference will now be made in detail to the preferred embodiments of the present invention, examples of which are illustrated in the accompanying drawings, to facilitate those having ordinary skill in the art to implement the invention. Wherever possible, the same reference numbers will be used throughout the drawings to refer to the same or like parts. Terminologies 'module' and 'unit' for components used in the following description are interchangeably usable in consideration of the facilitation for the specification writing but do not have distinctive meanings or roles. In describing embodiments disclosed in the present specification, if the details of the related art are determined as obscuring the gist of the embodiments disclosed in the present specification, the corresponding detailed description shall be omitted. The accompanying drawings are included to provide a further understanding of the invention, are incorporated in and constitute a part of this specification, and illustrate embodiments of the invention and together with the description serve to explain the principles of the invention. And, the accompanying drawings should be understood as including various modifications and variations of the invention that come within the scope of the appended claims and their equivalents.

Terminologies including ordinal numbers such as $1^{st}$, $2^{nd}$ and the like may be used to describe various components, by which the components may be non-limited. And, the terminologies are used for the purpose of discriminating one component from other components only.

If one component is mentioned as 'connected to' or 'accessing' another component, the former component may be connected to accesses the latter component in direct. Yet, it is understood that a different component may be present in-between. On the other hand, if one component is mentioned as 'directly connected to' or 'directly accessing' another component, it is understood that a different component may is not present in-between.

Singular expression may include plural expressions unless having a clear meaning in the context.

In the present application, such a terminology as 'include', 'have' and the like intends to designate that a feature, a number, a step, an operation, a component, a part or a combination thereof disclosed in the specification exists and should be understood as not excluding possibility of existence or addition of at least one or more features, numbers, steps, operations, components, parts or combinations thereof.

A camera module described in the present specification may apply to a mobile phone, a smartphone, a laptop computer, a digital broadcast terminal, a PDA (personal digital assistants), a PMP (portable multimedia player), a navigation system, a slate PC, a tablet PC, an ultrabook, a wearable device (e.g., a smartwatch, a smart glass, an HMD (head mounted display)) and the like.

Yet, it is apparent to those skilled in the art that a configuration of a camera module according to an embodiment disclosed in this specification is applicable to such a fixed terminal as a digital TV, a desktop computer, a digital signage and the like except a case of being applicable to a mobile terminal only.

Figure 2:
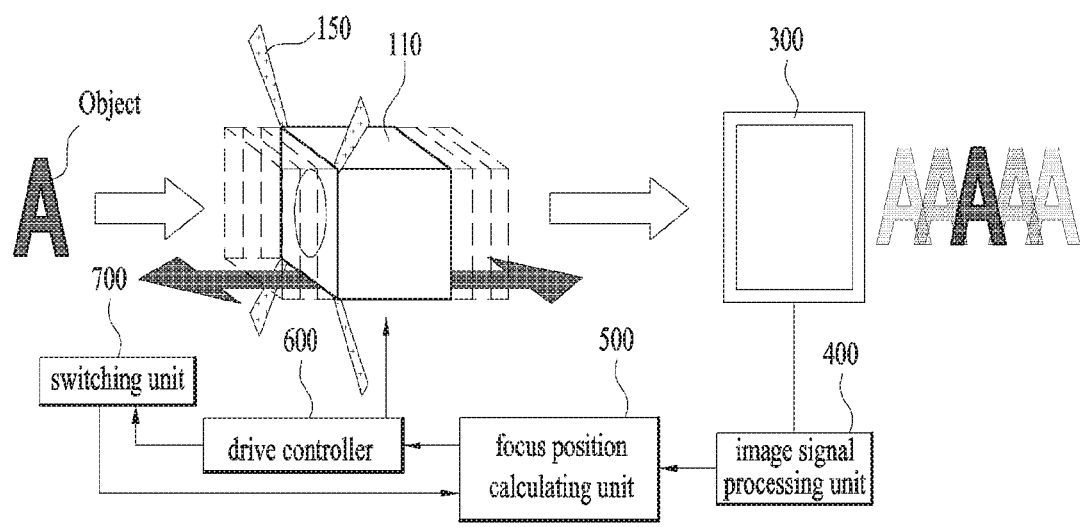

FIG. 1 and FIG. 2 are block diagrams to illustrate an auto focus control device of a camera module according to one embodiment of the present invention.

Referring to FIG. 1 and FIG. 2, an auto focus control device according to the present invention may include a fixed coil 200, a sensing unit 300, an image signal processing unit 400, a focus position calculating unit 500, a controller 600 and a switching unit 700.

Herein, the fixed coil 200 typically senses a movement of a lens unit 110 of a camera module 100.

For instance, the fixed coil 200 may include a coil sensor configured to sense current or voltage varying in response to a distance from the lens unit 110.

In some cases, the fixed coil 200 may be disposed in a manner of being spaced apart from one side of the lens unit 110 by leaving a predetermined space in-between and located on a line in a moving direction of the lens unit 110.

And, the sensing unit 300 typically senses an image incident on the lens unit 110.

For instance, the sensing unit 300 may include an image sensor configured to sense an image incident through a lens of the lens unit 110.

Herein, the lens unit 110 connected to a fixed unit through a spring 150 can move in response to auto focus execution. And, the sensing unit 300 can sense an image of a subject incident through the lens of the lens unit 110.

The fixed coil 200 and the sensing unit 300 may be disposed on one side of the lens unit 110 in parallel with each other in a manner of being spaced apart in a predetermined distance from each other for camera design convenience like efficient space arrangement and the like. In some cases, the fixed coil 200 and the sensing unit 300 may be disposed to oppose each other by leaving the lens unit 110 in-between.

The image signal processing unit 400 may process an image signal sensed by the sensing unit 300.

The focus position calculating unit 500 can calculate a focus position value based on the sensing signal of the fixed coil 200 and the image signal processed by the image signal processing unit 500.

Herein, the focus position calculating unit 500 may include in the controller 600, and the focus position calculating unit 500 may include a detecting unit and a calculating unit.

The detecting unit can detect a displacement value of a current or voltage from the fixed coil 200.

For instance, the detecting unit may include a half-wave rectifying unit configured to rectify a frequency signal for current or voltage received from the fixed coil 200 into a half-wave signal, a converting unit configured to convert the half-wave signal received from the half-wave rectifying unit into current or voltage, an amplifying unit configured to amplify a frequency signal for the current or voltage converted by the converting unit, and a peak detecting unit configured to detect a peak of the frequency signal amplified by the amplifying unit.

And, the calculating unit can calculate a focus position value of the lens unit 110 based on the current or voltage displacement value detected by the detecting unit.

The controller 600 can control the movement of the lens unit 110 by applying a drive signal to the lens unit 100 according to the calculated focus position value.

Herein, the controller 600 may receive a sensing signal of the fixed coil 200 in a specific time slot only and block a sensing signal of the fixed coil 200 received in the rest of tile slots.

The reason for this is that, since noise according to an OIS signal input is contained in the sensing signal, a focus position of the lens unit cannot be measured accurately.

Therefore, the present invention blocks a sensing signal not to be received in an OIS signal inputted time slot, thereby minimizing the noise generated from the sensing signal.

Namely, the present invention receives a sensing signal only in a specific time slot for not inputting an OIS signal and blocks a sensing signal in the rest of time slots. Thus, the present invention can receive a noise-free optimal sensing signal only, thereby eliminating malfunction of auto focus.

As described above, an OIS signal is a signal for focus correction due to destabilization. When an OIS signal is applied, since noise may be generated from a sensing signal, it is able to eliminate noise in a manner of blocking a sensing signal received in an OIS signal applied time slot.

For instance, the controller 600 can synchronize a specific time slot for receiving a sensing signal of the fixed coil 200 with a time slot for applying a drive signal to the lens unit 110.

Namely, the controller 600 can control the switching unit 700 to receive the sensing signal from the fixed coil 200 in a time slot for applying a drive signal to the lens unit 110 only.

Herein, the switching unit 700 is connected between the fixed coil 200 and the focus position calculating unit 500, thereby switching the sensing signal of the fixed coil 200.

Namely, the controller 600 can control the switching unit 700 so that the sensing signal of the fixed coil 200 can be applied to the focus calculating unit 500 in a specific time slot only.

The controller 600 may generate an OIS (optical image stabilizer) signal in the rest of time slots except the specific time slot for receiving the sensing signal of the fixed coil 200.

The controller 600 can detect a temperature change of the fixed coil 200 in the rest of time slots except the specific time slot for receiving the sensing signal of the fixed coil 200.

The reason for this is that, when the temperature change of the fixed coil 200 is detected, a current is applied to the fixed coil 200 in order to prevent malfunction of auto focus due to the temperature change of the fixed coil 200.

The controller 600 can control a movement of the lens unit by applying a drive signal to the lens unit according to a calculated focus position value.

Herein, Moreover, when a drive signal is applied to the lens unit 110, the controller 600 can synthesize the drive signal with a random high frequency signal.

In this case, the drive signal may include a signal component for moving the lens unit 110.

The high frequency signal synthesized in the drive signal may be a signal component for sensing a moving position of the lens unit 110 and include a frequency signal higher than the drive signal.

For instance, the high frequency signal synthesized in the drive signal may have about 100 kHz~5 MHz, by which the present invention is non-limited.

the drive signal synthesized by a first and a second frequency signal is applied to a moving coil for moving the lens unit.

Herein, the first frequency signal of the drive signal includes a signal component for moving the lens unit, and the second frequency signal of the drive signal includes a signal component for sensing a movement location of the lens unit and includes a frequency signal higher than the first frequency signal.

Moreover, when a drive signal is applied to the lens unit 110, the controller 600 may synthesize the drive signal with a random high frequency signal in the rest of time slots except a prescribed time slot of the device signal.

Herein, the prescribed time slot of the drive signal failing to be synthesized with the random high frequency signal may be synchronized with an image signal processing time slot of the image signal processing unit 400.

For instance, the image signal processing time slot may include an A/D conversion time slot for converting a received image signal into a digital signal from an analog signal.

According to the present invention, since the lens unit 110 is moved using a drive signal synthesized with a high frequency signal, noise may be generated from a captured image due to a high frequency effect.

Particularly, when an image signal is converted into a digital signal from an analog signal, since a high frequency signal affects an image, noise is generated from an outputted image.

Therefore, the controller 600 generates a synchronization signal corresponding to an image signal processing time slot of the image signal processing unit 400 and is then able to synthesize a random high frequency signal in the rest of the time slot except the image signal processing time slot in the whole time slot of a drive signal based on the generated synchronization signal.

Namely, the controller 600 does not synthesize a high frequency signal only in a drive signal time slot corresponding to an A/D conversion time slot for converting an image signal into a digital signal from an analog signal in the whole time slot of the drive signal but synthesizes a high frequency signal in the rest of the time slot, thereby minimizing noise in an image.

Moreover, the controller 600 generates a synchronization signal corresponding to an OIS input time slot for applying an OIS (optical image stabilizer) signal and may be then able to synthesize a random high frequency signal in the rest of the time slot except the OIS input time slot in the whole time slot of the drive signal.

Herein, the OIS signal is a signal for focus correction due to destabilization (e.g., a shaking hand). Noise may be generated from an image by a high frequency signal when the OIS signal is applied.

Hence, the controller 600 does not synthesize a high frequency signal in an OIS input time slot only in a whole time slot of a drive signal but synthesizes a high frequency signal in the rest of the time slot, thereby minimizing noise in an image.

The controller 600 generates a first synchronization signal corresponding to an image signal processing time slot of the image signal processing unit 400, generates a second synchronization signal corresponding to an OIS input time slot for applying an OIS (optical image stabilizer) signal, and may be then able to synthesize a random high frequency signal in the rest of the time slot except the image signal processing time slot and the OIS input time slot in the whole time slot of a drive signal based on the generated first and second synchronization signals.

Namely, the controller 600 does not synthesize a high frequency signal in an image signal processing time slot and an OIS input time slot only in a whole time slot of a drive signal but synthesizes a high frequency signal in the rest of the time slot, thereby minimizing noise in an image.

Moreover, if noise is detected from the image signal processed by the image signal processing unit 400, the controller 600 can decrease amplitude of the high frequency signal synthesized with the drive signal.

Namely, the controller 600 decreases amplitude of a high frequency signal synthesized with a drive signal, thereby minimizing noise in an image.

Meanwhile, the camera module 100 may include a fixed unit 130 having a perforated hole formed therein, a magnet 140 disposed on an inner lateral surface of the perforated hole of the fixed unit 130, a lens unit 110 configured to be linearly movable within the perforated hole of the fixed unit 130 by including at least one lens, and a moving coil 120 configured to enclose an outer surface of the lens unit 110.

Herein, the winding number of the moving coil 120 may be different from that of the fixed coil included in the fixed coil 200.

For instance, the winding number of the moving coil 120 may be greater than that of the fixed coil included in the fixed coil 200.

The camera module 100 may further include a spring 150 configured to provide an elastic force according to the movement of the lens unit 100 by being connected between the fixed unit 130 and the lens unit 110.

Herein, a damper may be disposed between the spring 150 and the fixed unit 130.

In particular, the damper may be disposed adjacent to a connecting end of the spring 150 and the fixed unit 130.

The reason why the damper is provided is to suppress the natural oscillation of the spring. Hence, by reducing the hysteresis properties, it is able to prevent the error of the auto focus.

The present invention comprises a fixed unit 130 having a perforated hole formed therein, a magnet 140 placed inside the fixed unit, a lens unit 110 including at least one lens and configured to linearly move inside the perforated hole of the fixed unit 130, a moving coil 120 placed on a surface of the lens unit 110, a fixed coil 200 receiving from the moving coil 120, a variable current or a variable voltage according a distance moved by the moving coil 120, an image signal processing unit 400 processing an image signal sensed by an image sensing unit, and a controller 600 configured to provide a signal comprising first frequency signal and second frequency signal to the moving coil 120, wherein the fixed coil 200 receiving the variable current or the variable voltage through the second frequency signal, calculate a focus location value based on the received variable current or variable voltage according to distance moved by the moving coil 120 from the fixed coil 200 and the image signal processed by the image signal processing unit 400, and control the lens unit 110 to move by applying the first frequency signal to the moving coil 120 according to the calculated focus location value, wherein the second frequency signal is higher than the first frequency signal and is comprised of the signal during a prescribed time.

Also, the present invention comprises a fixed unit 130 having a perforated hole formed therein, a magnet 140 placed inside the fixed unit, a lens unit 110 including at least one lens and configured to linearly move inside the perforated hole of the fixed unit 130, a moving coil 120 placed on a surface of the lens unit 110, a fixed coil 200 receiving from the moving coil 120, a variable current or a variable voltage according a distance moved by the moving coil 120, an image signal processing unit 400 processing an image signal sensed by an image sensing unit, and a controller 600 configured to provide a signal comprising first frequency signal and second frequency signal to the moving coil 120, wherein the fixed coil 200 receiving the variable current or the variable voltage through the second frequency signal, and control the lens unit 110 to move by applying the first frequency signal to the moving coil 120 based on the received the variable current or the variable voltage according a distance moved by the moving coil 120 from the fixed coil 200 and the image signal processed by the image signal processing unit 400, wherein the second frequency signal is higher than the first frequency signal and is comprised of the signal during a prescribed time.

Herein, the first frequency signal of the drive signal includes a signal component for moving the lens unit 110.

Also, the second frequency signal of the drive signal includes a signal component for sensing a movement location of the lens unit 110 and includes a frequency signal higher than the first frequency signal.

That is, the controller provides a signal comprising first frequency signal and second frequency signal to the moving coil, and the fixed coil receives the variable current or the variable voltage through the second frequency signal.

And the controller 600 is further configured to synthesize the second frequency signal with the first frequency signal only during a prescribed time slot of the first frequency signal when applying the drive signal to the moving coil 120.

Herein, a time slot of the first frequency signal not synthesized with the second frequency signal is in synchronization with a time slot of the processed image signal of the image signal processing unit.

Also, the controller 600 generates a synchronization signal corresponding to an image signal processing time slot of the image signal processing unit and synthesizes the second frequency signal in the rest of the time slot except the image signal processing time slot in the entire time slot of the first frequency signal based on the generated synchronization signal.

Also, the controller 600 generates a synchronization signal corresponding to an OIS (optical image stabilizer) input time slot for applying an OIS signal and then synthesizes the second frequency signal in the rest of the time slot except the OIS input time slot in the entire time slot of the first frequency signal.

Also, the controller 600 generates a first synchronization signal corresponding to an image signal processing time slot of the image signal processing unit, generates a second synchronization signal corresponding to an OIS (optical image stabilizer) input time slot for applying an OIS signal, and synthesizes the second frequency signal in the rest of the time slot except the image signal processing time slot and the OIS input time slot in the entire time slot of the first frequency signal based on the generated first and second synchronization signals.

Also, if noise is detected from the image signal processed by the image signal processing unit, the controller 600 decreases amplitude of the second frequency signal synthesized with the first frequency signal.

Meanwhile, the fixed coil 200 is placed by being evenly spaced apart from one side of the lens unit 110 and located on a line of a moving direction of the lens unit 110.

Also, the sensing unit 300 comprises an image sensor sensing the image incident through a lens of the lens unit 110.

Also, the fixed coil 200 and the sensing unit 300 are placed either in a manner of being spaced evenly apart from one side of the lens unit 110 or in a manner of being placed opposite to each other by leaving the lens unit 110 in-between.

Also, the controller 600 comprises a detecting unit detecting a displacement value of a current or voltage from the fixed coil 200, and a calculating unit calculating the focus position value of the lens unit based on the image signal processed by the image signal processing unit and the detected displacement value of the current or voltage from the detecting unit.

Herein, the detecting unit comprises a half-wave rectifying unit rectifying a frequency signal for a current or voltage sensed from the fixed coil 200 into a half-wave signal, a converting unit converting the half-wave signal received from the half-wave rectifying unit into a current or voltage, an amplifying unit amplifying a frequency signal for the current or voltage converted by the converting unit, and a peak detecting unit detecting a peak of the frequency signal amplified by the amplifying unit.

Also, the present invention includes an OIS coil placed between the fixed unit 130 and the lens unit 110, and an OIS signal is applied to the OIS coil for focus correction due to destabilization (e.g., a shaking hand).

Thus, the present invention blocks a sensing signal of the fixed coil 200, which is received in the rest of the time slot except a specific time slot, by disposing the switching unit 700, thereby implementing accurate auto focus by minimizing noise due to an OIS signal.

The present invention can prevent malfunction of an auto focus due to noise in a manner of performing an OIS signal generation and a temperature sensing of a fixed coil in a time slot for cutting off a sensing signal.

The present invention can prevent malfunction of an auto focus due to a temperature change of a fixed coil in a manner of correcting a focus position of a lens unit by detecting a temperature change of the fixed coil.

The present invention can minimize noise caused to an image in a manner of synthesizing a random high frequency signal in the rest of time slot except an image signal processing time slot with respect to the whole time slot of a drive signal.

And, the present invention can achieve auto focus error prevention and auto focus time reduction in a manner of reducing natural oscillation of a spring by disposing a damper between the spring and a lens unit.

Figure 3:
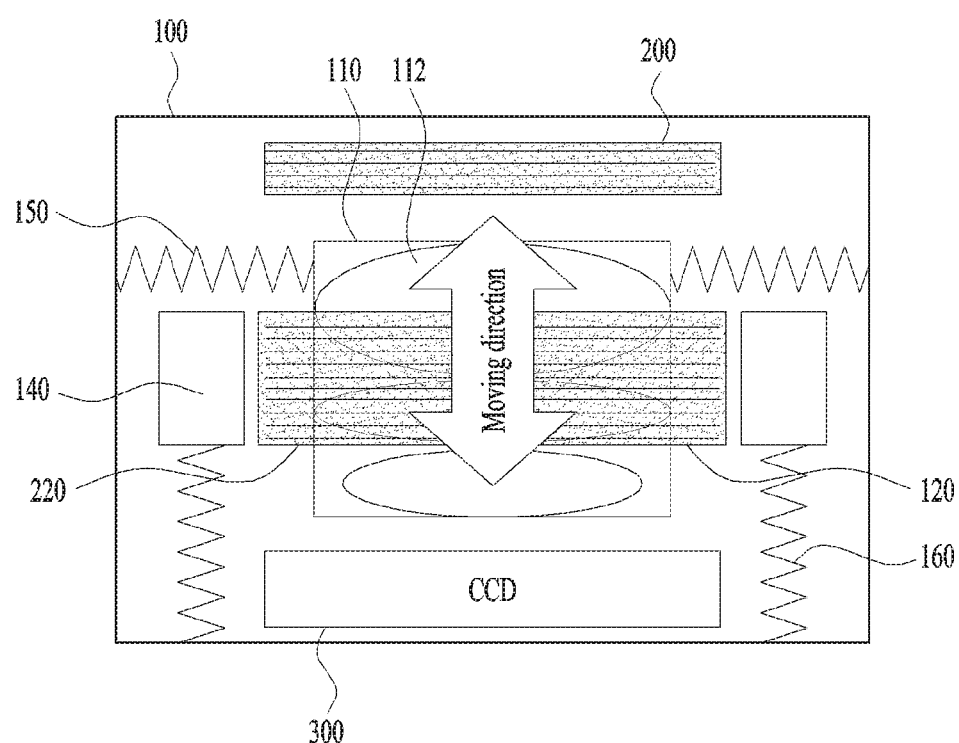
FIG. 3 is a diagram of the camera module shown in FIG. 1.

FIG. 3 is a diagram of the camera module shown in FIG. 1.

Referring to FIG. 3, a camera module 100 according to the present invention may include a fixed unit 130 having a magnet 110 and a fixed coil of a fixed coil 200 disposed therein and a lens unit 110 having a lens 112 and a moving coil 120 disposed therein.

In this case, the fixed unit 130 may have a perforated hole formed in a central region of the fixed unit 130.

Herein, the magnet 140 may be disposed on an inner lateral side of the perforated hole of the fixed unit 130.

For instance, there may be a single magnet 140. In some cases, a multitude of magnets 140 may be provided.

In case of a multitude of the magnets 140 are provided, the magnets 140 may be disposed in a manner of being space apart from each other in equal intervals. In some cases, the magnets 140 may be disposed in different intervals.

A multitude of the magnets 140 may be disposed symmetric to an axis of coordinates, which passes through a center of the perforated hole of the fixed unit 130.

The reason for disposing a multitude of the magnets 140 symmetric to the axis of the coordinates, which passes through the center of the perforated hole of the fixed unit 130, is to stably detect a displacement value of current or voltage according to the movement of the lens unit 110 without external influence.

The lens unit 110 includes at least one lens 112 and is able to linearly move within the perforated hole of the fixed unit 130.

The moving coil 120 is disposed to enclose an outer surface of the lens unit 110 so as to be movable together with the lens unit 110.

In this case, the moving coil 120 and the magnet 140 configure an actuator for moving the lens unit 110 and are able to drive the lens unit 110 to linearly move in top or bottom direction.

The fixed coil 200 is disposed in the fixed unit 100 and is able to receive a current or voltage, which varies according to a distance from the moving coil 120, from the moving coil 120.

For instance, the fixed coil 200 may include a coil sensor configured to sense a current or voltage varying according to a distance from the lens unit 110.

And, the fixed coil 200 is disposed by being spaced apart from one side of the lens unit 110 by a predetermined interval and can be located on a line of a moving direction of the lens unit 110.

Hence, the fixed coil 200 and the moving coil 120 can induce a current or voltage to the fixed coil 200 from the moving coil 120 by electromagnetic induction.

In doing so, the induced current or voltage value may vary depending on a distance between the fixed coil 200 and the moving coil 120.

Namely, the current or voltage value induced to the fixed coil 200 varies depending on a vertical distance between the fixed coil 200 and the moving coil 120. Using such a displacement value, it is able to predict a position value of the lens unit 110.

Using the predicted position value of the lens unit 110, it is able to find an optimal auto focus position value and is also able to control a real position value of the lens unit 110 to an optimal focus position value.

Moreover, the winding number of the fixed coil 200 may be different from that of the moving coil 120.

For instance, the winding number of the fixed coil 200 may be smaller than that of the moving coil 120.

The reason why the winding number of the fixed coil 200 is smaller than that of the moving coil 120 is that an overall size of the camera module can be reduced and that a frequency signal for current or voltage induced to the fixed coil 200 can be amplified.

In some cases, the winding number of the fixed coil 200 may be equal to that of the moving coil 120.

The moving coil 120 may send a signal generated from synthesizing a low frequency signal (i.e., a drive signal) with a random high frequency signal to the fixed coil 200.

In particular, the drive signal applied to the moving coil 120 of the lens unit 110 may include a signal generated from synthesizing a drive signal of a low frequency with a random high frequency signal.

Hence, when the fixed coil 200 receives a frequency signal for a current or voltage induced from the moving coil 120 by electromagnetic induction, the received frequency single may include a signal generated from synthesizing a low frequency signal with a high frequency signal.

In this case, the reason why the drive signal having the low frequency signal synthesized with the high frequency signal is applied to the moving coil 120 is that a displacement value of a current or voltage can be easily detected by increasing a frequency signal for the current or voltage induced to the fixed coil 200 according to the electromagnetic induction.

The drive signal is synthesized by a first and a second frequency signal.

Herein, the first frequency signal of the drive signal includes a signal component for moving the lens unit 110, and the second frequency signal of the drive signal includes a signal component for sensing a movement location of the lens unit 110. The second frequency signal is a frequency signal higher than the first frequency signal.

The camera module 100 includes an OIS coil placed between the fixed unit 130 and the lens unit 110, and an OIS signal is applied to the OIS coil for focus correction due to destabilization (e.g., a shaking hand).

The camera module 100 of the present invention may further include a spring 150 configured to provide an elastic force according to the movement of the lens unit 100 by being connected between the fixed unit 130 and the lens unit 110.

Herein, a damper (not shown) may be disposed between the spring 150 and the fixed unit 130.

In particular, the damper may be disposed adjacent to a connecting end of the spring 150 and the fixed unit 130.

The reason why the damper is provided is to suppress the natural oscillation of the spring. Hence, by reducing the hysteresis properties, it is able to prevent the error of the auto focus.

And, the present invention may include an OIS (optical image stabilization) spring 160 configured to correct destabilization of the lens unit 110 due to a shaking hand for example.

Figure 4:
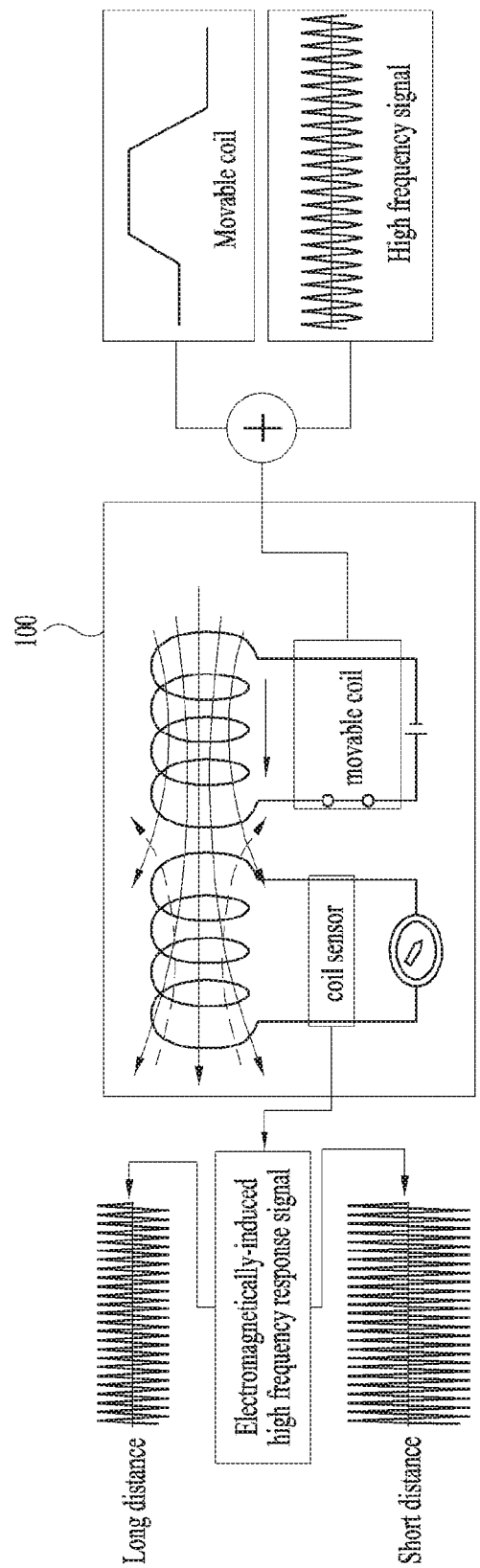
FIG. 4 is a diagram to describe electromagnetic induction between a fixed coil of a fixed coil and a moving coil shown in FIG. 1.

FIG. 4 is a diagram to describe electromagnetic induction between the fixed coil of the fixed coil and the moving coil shown in FIG. 1.

Referring to FIG. 4, a moving coil of a camera module 100 receives a signal generated from synthesizing a drive signal (i.e., a low frequency signal) with a random high frequency signal and is then able to transmit a corresponding signal to a fixed coil.

Namely, the drive signal applied to the moving coil of the lens unit may include a signal generated from synthesizing a drive signal of a low frequency signal with a random high frequency signal.

Hence, when the fixed coil receives a frequency signal for a current or voltage induced from the moving coil by electromagnetic induction, the received frequency single may include a signal generated from synthesizing a low frequency signal with a high frequency signal.

In this case, an electromagnetically-induced high frequency response signal received by the fixed coil decreases if a distance between the fixed coil and the moving coil increases. The electromagnetically-induced high frequency response signal increases if a distance between the fixed coil and the moving coil decreases.

Thus, since the electromagnetically-induced high frequency response signal received by the fixed coil varies depending on the distance between the fixed coil and the moving coil, the focus position calculating unit detects a displacement value of the current or voltage received by the fixed coil and the controller can predict a position value of the lens unit using this displacement value.

And, the controller finds an optimal auto focus position value using the predicted position value of the lens unit and is able to control the movement of the lens unit so that a real position value of the lens unit can move to the optimal focus position value.

Figure 5:
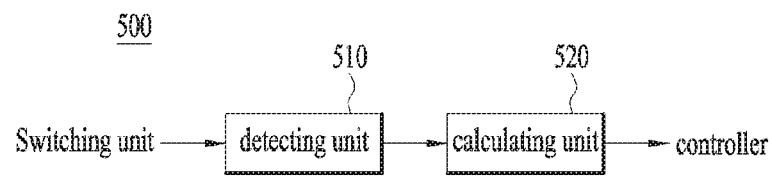
FIG. 5 is a block diagram of a focus position calculating unit shown in FIG. 1.
Figure 6:
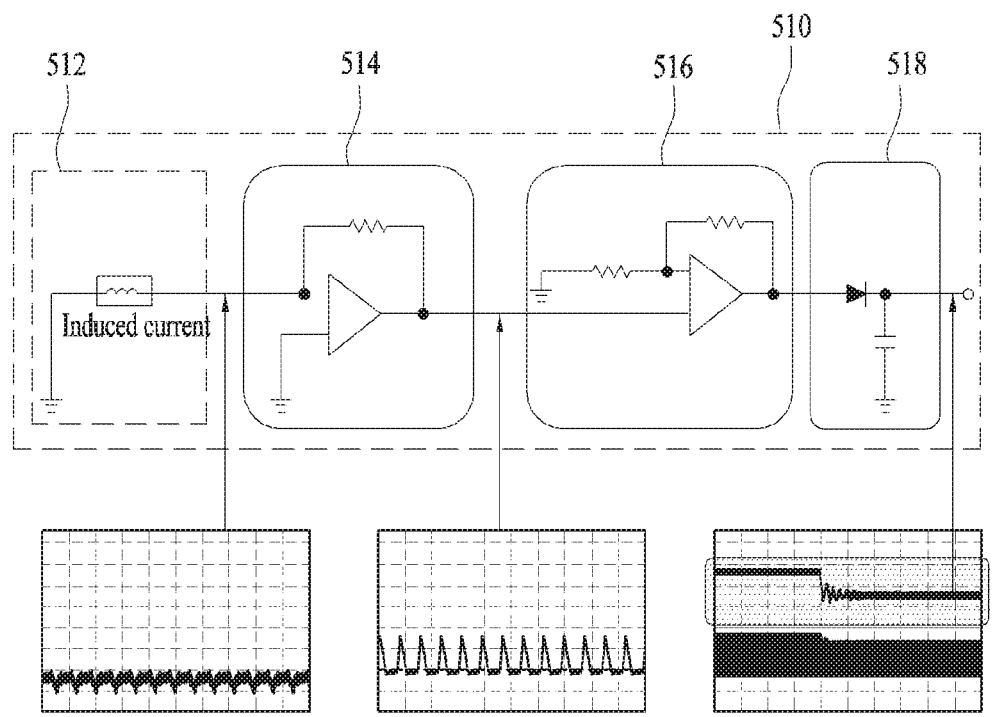
FIG. 6 is a circuit diagram of a detecting unit shown in FIG. 5.

FIG. 5 is a block diagram of a focus position calculating unit shown in FIG. 1. FIG. 6 is a circuit diagram of a detecting unit shown in FIG. 5.

Referring to FIG. 5 and FIG. 6, a focus position calculating unit 500 may calculate a focus position value based on a sensing signal received from a fixed coil and an image signal processed by an image signal processing unit.

Herein, the focus position calculating unit 500 may include a detecting unit 510 and a calculating unit 520.

The detecting unit 510 may detect a displacement value of a current or voltage from the fixed coil.

For instance, the detecting unit 510 may include a half-wave rectifying unit 512 configured to rectify a frequency signal for current or voltage received from the fixed coil into a half-wave signal, a converting unit 514 configured to convert the half-wave signal received from the half-wave rectifying unit 512 into a current or voltage, an amplifying unit 516 configured to amplify a frequency signal for the current or voltage converted by the converting unit 514, and a peak detecting unit 518 configured to detect a peak of the frequency signal amplified by the amplifying unit 516.

And, the calculating unit 520 can calculate a focus position value of a lens unit based on the current or voltage displacement value detected by the detecting unit 510.

Figure 7:
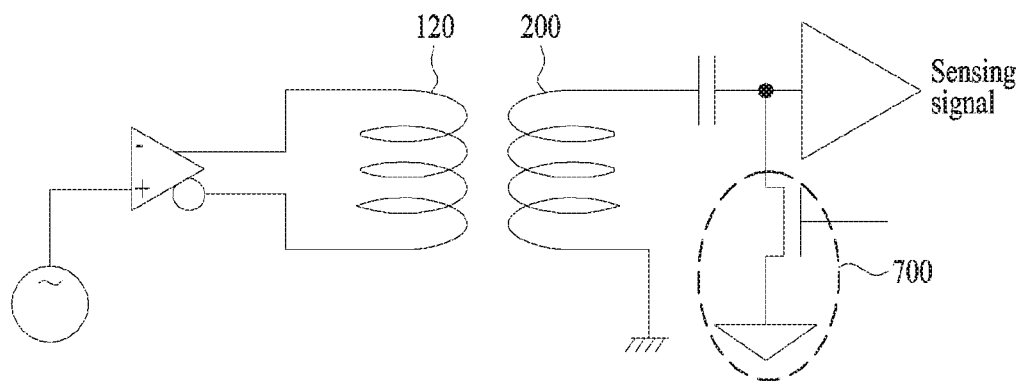
FIGS. 7 to 9 are diagrams to describe a process for cutting off noise of a sensing signal according to the present invention.
Figure 8:
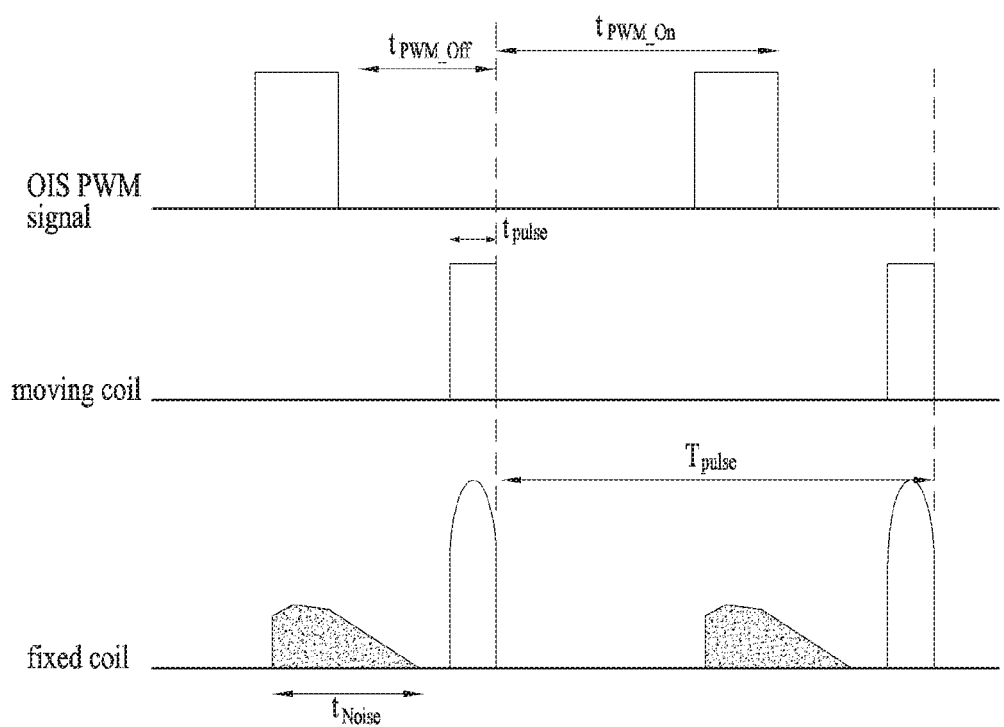
Figure 9:
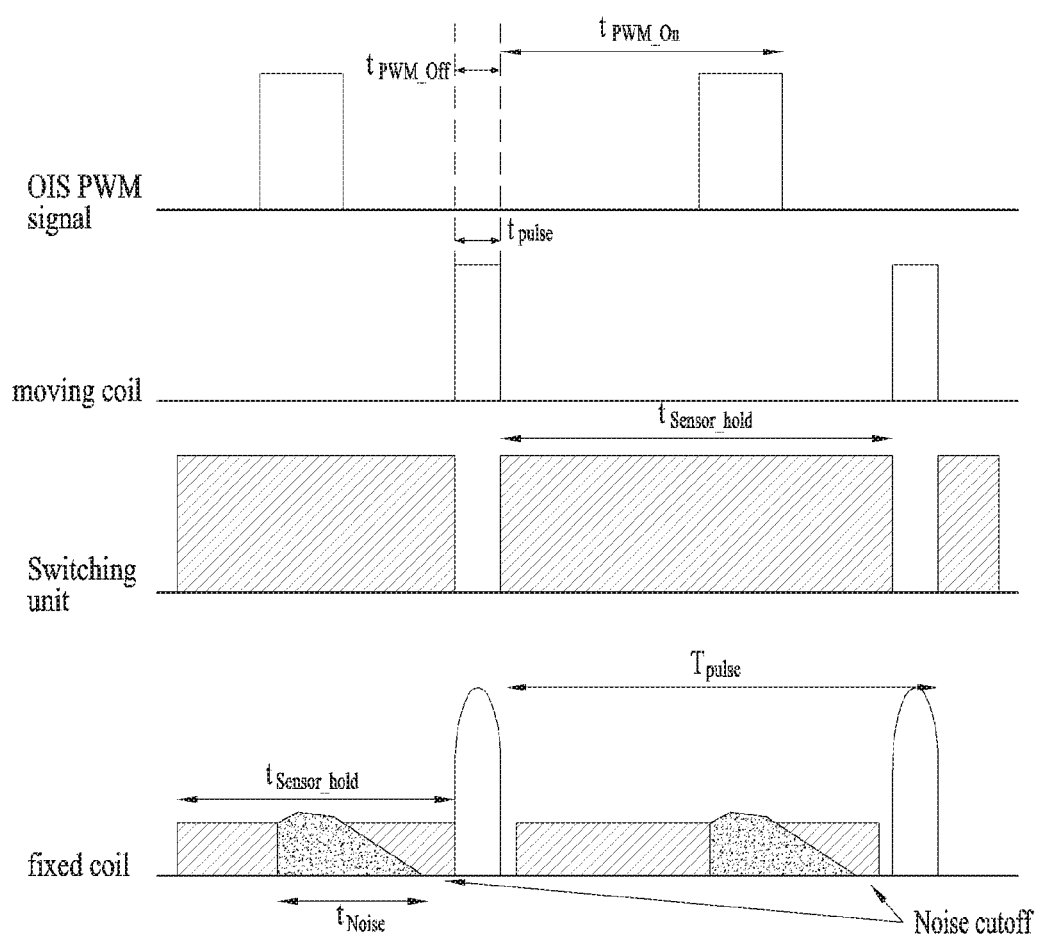

FIGS. 7 to 9 are diagrams to describe a process for cutting off noise of a sensing signal according to the present invention. FIG. 7 is a circuit diagram to illustrate the switching unit shown in FIG. 1, FIG. 8 is a waveform diagram to illustrate noise of a sensing signal, and FIG. 9 is a waveform diagram to illustrate noise cutoff of a sensing signal.

Referring to FIGS. 7 to 9, a controller of the present invention can receive a sensing signal of a fixed coil 200 in a specific time slot only and block the sensing signal, which is received in the rest of the time slot, of the fixed coil 200.

Herein, the specific time slot may include a time slot for applying a drive signal to a moving coil of a lens unit.

The reason for blocking a sensing signal received in the rest of the time slot except the specific time slot is that, since noise according to an OIS signal input is contained in the sensing signal, it is unable to accurately measure a focus position of the lens unit.

Therefore, the present invention cuts off a sensing signal not to be received in an OIS signal inputted time slot, thereby minimizing generation of noise from the sensing signal.

Namely, according to the present invention, as a sensing signal is received in a specific time slot for not inputting an OIS signal but the sensing signal is blocked in the rest of the time slot, an optimal sensing signal failing to contain noise can be received only. Therefore, the present invention can eliminate malfunction of auto focus.

Thus, when an OIS signal, which is a signal for focus correction due to destabilization, is applied, since noise may be possible generated from a focus signal, noise can be eliminated by blocking a sensing signal received in a time slot in which the OIS signal is applied.

Referring to FIG. 7, a switching unit 700 is connected between the fixed coil 200 and a focus position calculating unit (not shown) and is able to switch a sensing signal of the fixed coil 200.

Herein, a controller may control the switching unit 700 to receive a sensing signal from a fixed coil 200 only in a time slot for applying a drive signal to a moving coil 120 of a lens unit.

Herein, the controller 600 can synchronize a specific time slot for receiving the sensing signal of the fixed coil 200 with the time slot for applying the drive signal to the moving coil 120 of the lens unit.

Namely, the controller 600 may control the switching unit 700 to enable the sensing signal of the fixed coil 200 to be applied to the focus position calculating unit in the specific time slot only.

Referring to FIG. 8, a time slot $t_{pulse}$ for applying a drive signal to a moving coil of a lens unit and a time slot for receiving a sensing signal of a fixed coil can be synchronized with each other.

Herein, in case that an OIS signal is applied, noise is introduced into the fixed coil. Yet, a time amounting to $t_{noise}$ is required until the noise is cancelled due to an inductance component of the fixed coil.

Therefore, in order to prevent the fixed coil from being affected by the OIS signal, a time slot $t_{PWM\_OFF}$ for turning off the OIS signal requires a time amounting to a sum of a time slot $t_{pulse}$ for applying a drive signal to the lens unit and a time slot $t_{noise}$ for canceling the noise.

Namely, the relationship between an input period of a drive signal and an input period of an OIS signal is described as follows.

$$T_{pulse} = t_{PWM\_ON}(t_{pulse} + t_{noise})$$

Here, $T_{pulse}$ indicates an input period of a drive signal, $t_{PWM\_ON}$ indicates a time slot for turning off an OIS signal, $t_{pulse}$ indicates a time slot for applying a drive signal to a lens unit, and $t_{noise}$ indicates a time slot for cancelling noise.

Therefore, with respect to a current input period of a drive signal, noise cannot help being generated from a sensing signal due to the effect of an OIS signal.

Although the effect of the OIS signal can be avoided in a manner of increasing a current input period of a drive signal, it may cause a problem that performance of auto focus is considerably degraded.

To solve such problems, the present invention receives a sensing signal in a specific time slot for applying a drive signal only but cuts off a sensing signal in the rest of time slot, thereby blocking noise introduced by the effect of an OIS signal.

Referring to FIG. 9, a controller controls a switching unit to block a sensing signal received in the rest of time slot $t_{sensor\_hold}$ except a time slot $t_{pulse}$ for applying a drive signal to a moving coil of a lens unit.

Namely, the controller blocks a sensing signal received in a noise cancelled time slot $t_{noise}$ but outputs a sensing signal received in a specific time slot $t_{pulse}$ for applying the drive signal to the lens unit only, thereby eliminating the sensing signal having the noise.

Thus, the present invention blocks a sensing signal of a fixed coil received in the rest of time slot except a specific time slot by disposing a switching unit, thereby minimizing noise due to an OIS signal to implement accurate auto focus.

And, the present invention generates to input an OIS signal in a time slot for blocking a sensing signal, thereby preventing malfunction of auto focus due to noise.

In the present invention, the controller is configured to receive the sensed signal only during a specific time slot in order for the sensed signal to not include noise due to OIS signal and apply the OIS signal to the OIS coil during the rest of a time slot of the sensed signal.

Herein, an Optical Image Stabilizer (OIS) coil is placed between the fixed unit and the lens unit to correct destabilization of the lens unit.

Also, the controller is configured to synchronize the specific time slot for receiving the sensed signal with a time slot for applying the drive signal to the moving coil.

Also, the present invention includes a switching unit for switching the sensed signal connected between the fixed coil and the controller, and the controller is configured to control the switching unit to receive the sensed signal only during the specific time slot.

Figure 10:
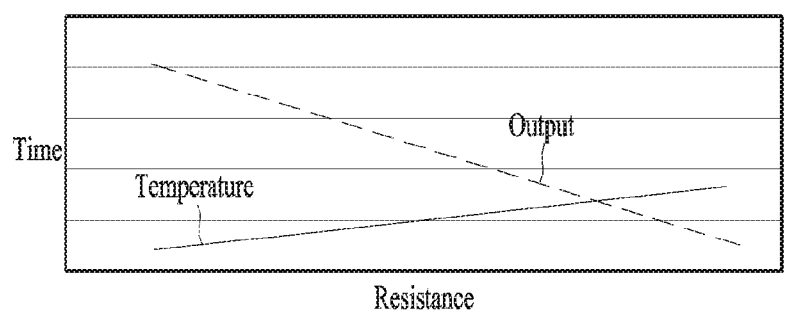
FIG. 10 is a graph to illustrate resistance and output changes of a fixed coil according to a temperature change.
Figure 11:
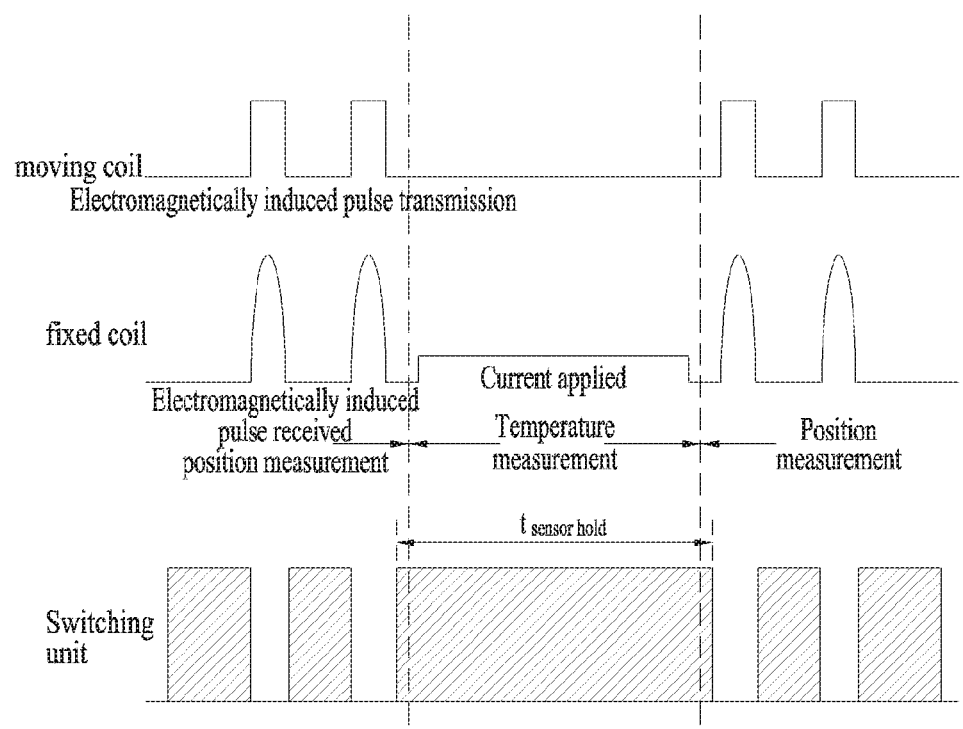
FIG. 11 is a timing diagram to illustrate a temperature measurement time of a fixed coil.

FIG. 10 is a graph to illustrate resistance and output changes of a fixed coil according to a temperature change. FIG. 11 is a timing diagram to illustrate a temperature measurement time of a fixed coil.

First of all, a fixed coil of the present invention may use a coil sensor.

Herein, if a temperature of a camera module rises, as shown in FIG. 10, coil resistance typically increases linearly.

As the coil resistance increases, an output signal of the fixed coil may decreases to the contrary.

Therefore, regarding the fixed coil, the output signal varies together in response to a temperature change.

Once the output signal of the fixed coil is changed, a controller is unable to accurately measure a current moving position of a lens unit.

Namely, the controller is able to calculate a current moving position of a lens based on a prescribed output signal received from the fixed coil. If the output signal of the fixed coil is changed according to the temperature change, the current moving position of the lens unit calculated by the controller may be erroneous.

Hence, the controller calculates a current moving position of the lens unit and measures a temperature of the fixed coil, thereby checking whether the calculated current moving position of the lens unit is accurate.

Namely, after a temperature of the fixed coil has been measured, if the measured temperature of the fixed coil is raised to be higher than a reference temperature, the controller can confirm that the calculated current moving position of the lens unit is erroneous.

Therefore, since the calculated current moving position of the lens unit is erroneous, the controller should correct the current moving position of the lens unit.

To this end, the controller measures a temperature of the fixed coil, calculates a temperature change value into which the measured temperature is changed from a reference temperature, and is then able to extract a temperature compensation value corresponding to the temperature change value by referring to a compensation table previously stored in a storage unit.

Based on the extracted temperature compensation value, the controller may correct the current moving position of the lens unit.

For instance, when the controller detects a temperature change of the fixed coil, the controller measures a resistance value of the fixed coil and is then able to detect the temperature change of the fixed coil based on the measured resistance value.

Herein, when the controller measures the resistance value of the fixed coil, the controller applies a current to the fixed coil, measures a voltage of the current applied fixed coil, and is then able to calculate the resistance value of the fixed coil based on the current value applied to the fixed coil and the measured voltage value.

In doing so, the applied value may include a direct current (DC).

And, referring to FIG. 11, when the controller applies a current to the coil sensor that is the fixed coil, the controller can apply the current in a time slot between signal pulses sensed by the fixed coil.

Namely, when a current is applied, it is necessary for the controller to apply the current in a time slot between an electromagnetically induced pulse and a pulse in order to avoid overlapping with a pulse for electromagnetically induced displacement measurement.

The reason for this is that the controller should calculate a moving position of the lens unit by receiving an electromagnetically induced pulse.

Hence, in a time slot between pulses, the controller measures a temperature of the fixed coil by applying a current to the fixed coil. The controller is then able to re-correct a current moving position of the lens unit according to the measured temperature change of the fixed coil.

The controller of the present invention may correct a moving position of the lens unit in two ways as follows.

First of all, according to a first scheme, each time the lens unit moves in a predetermined distance, the controller measures a current position of the moved lens unit based on a sensing signal of the fixed coil, detects a temperature of the fixed coil, and then corrects a current position of the lens unit according to the detected temperature change of the fixed coil. Particularly, the moving position of the lens unit is corrected several times until the lens unit arrives at a focus position. After the lens unit has arrived at the focus position, the focus position of the lens unit is corrected once.

Secondly, according to a second scheme, once the lens unit arrives at a focus position, the controller detects a temperature change of the fixed coil and then corrects the focus position of the lens unit according to the detected temperature change of the fixed coil. Particular, the moving position of the lens unit is not corrected until the lens unit arrives at the focus position. Only after the lens unit has arrived at the focus position, the focus position of the lens unit is corrected once.

Herein, according to the first scheme, since the moving position of the lens unit is precisely measured, it is able to prevent malfunction of auto focus. Therefore, it is advantageous in that a photo or image can be captured quickly and accurately.

Thus, the controller receives a sensing signal in a specific time slot only by controlling the switching unit and is able to detect an OIS (optical image stabilizer signal) or a temperature change of the fixed coil in the rest of time slot $t_{sensor\_hold}$ except the specific time slot.

Accordingly, the present invention performs the temperature detection of the fixed coil in a sensing signal blocked time slot, thereby preventing malfunction of auto focus due to noise.

And, the present invention detects a temperature change of the fixed coil and then corrects a focus position of the lens unit, thereby preventing malfunction of auto focus due to the temperature change of the fixed coil.

In the present invention, the controller is configured to detect a temperature change of the fixed coil and to correct a focus position of the lens unit corresponding to the detected temperature change of the fixed coil.

Also, the controller is configured to measure a resistance value of the fixed coil and detect the temperature change of the fixed coil based on the measured resistance value of the fixed coil.

Herein, the controller is further configured to apply current to the fixed coil when measuring the resistance value of the fixed coil and measure a voltage of the fixed coil after applying the current, and measure the resistance value of the fixed coil based on the applied current and the measured voltage.

Herein, the controller is further configured to apply the current in between a signal pulse sensed from the fixed coil when current is applied to the fixed coil.

Also, the controller is further configured to measure a current position of a moved lens unit based on the sensing signal of the fixed coil when the lens unit moves, and when the measured current position of the lens unit is the focus position, detect the temperature change of the fixed coil, and based on the temperature change, correct the focus position of the lens unit.

Also, the controller is further configured to measure a current position of a moved lens unit based on the sensing signal of the fixed coil when the lens unit moves, and measure a real-time temperature change of the fixed coil, and based on the measured temperature change of the fixed coil, correct the current position of the lens unit.

Figure 12:
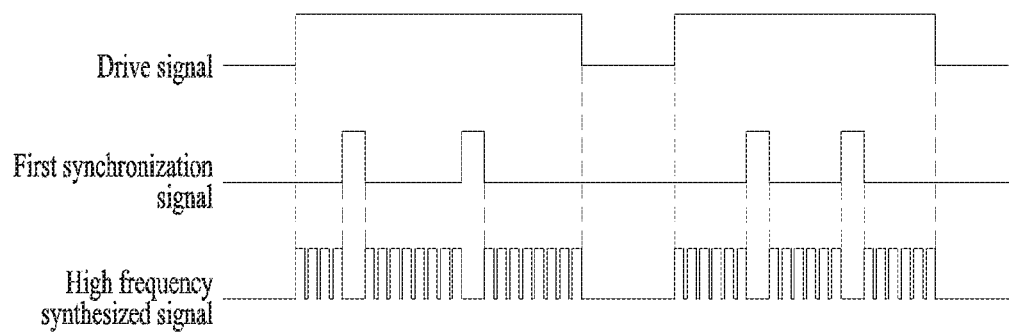
FIGS. 12 to 15 are diagrams to describe a high frequency signal synthesizing method according to the present invention.

FIG. 12 is a diagram to describe a high frequency signal synthesizing method according to a first embodiment of the present invention.

Referring to FIG. 12, when a drive signal is applied to the lens unit, the controller may synthesize the drive signal with a random high frequency signal in the rest of time slot except a prescribed time slot of the device signal.

The drive signal is a signal component for moving the lens unit. And, the high frequency signal synthesized with the drive signal is a signal component for sensing a moving position of the lens unit and may include a frequency signal higher than the drive signal.

Herein, the prescribed time slot of the drive signal failing to be synthesized with the random high frequency signal may be synchronized with an image signal processing time slot of the image signal processing unit.

For instance, the image signal processing time slot may include an A/D conversion time slot for converting a received image signal into a digital signal from an analog signal.

According to the present invention, since the lens unit 110 is moved using a drive signal synthesized with a high frequency signal, noise may be generated from a captured image due to a high frequency effect.

Particularly, when an image signal is converted into a digital signal from an analog signal, since a high frequency signal affects an image, noise is generated from an outputted image.

Therefore, the first embodiment of the present invention generates a first synchronization signal corresponding to an image signal processing time slot of the image signal processing unit and is then able to synthesize a random high frequency signal in the rest of the time slot except the image signal processing time slot in the whole time slot of a drive signal based on the generated first synchronization signal.

According to the first embodiment of the present invention, the controller does not synthesize a high frequency signal only in a drive signal time slot corresponding to an A/D conversion time slot for converting an image signal into a digital signal from an analog signal in the whole time slot of the drive signal but synthesizes a high frequency signal in the rest of the time slot, thereby minimizing noise in an image.

Figure 13:
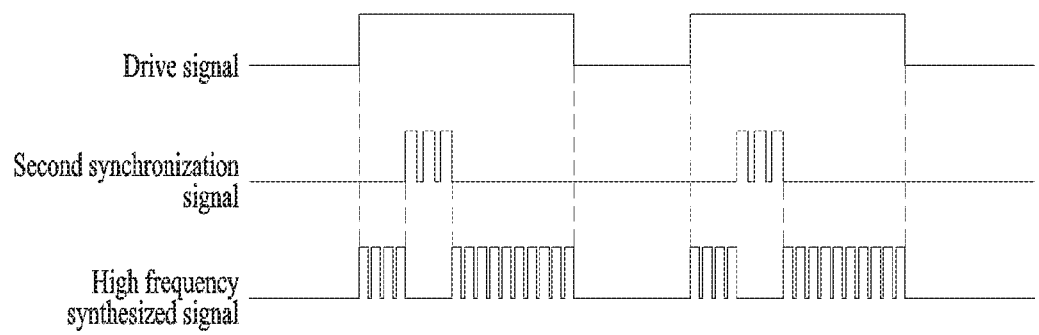

FIG. 13 is a diagram to describe a high frequency signal synthesizing method according to a second embodiment of the present invention.

Referring to FIG. 13, when a drive signal is applied to the lens unit, the controller may synthesize the drive signal with a random high frequency signal in the rest of time slot except a prescribed time slot of the device signal.

The drive signal is a signal component for moving the lens unit. And, the high frequency signal synthesized with the drive signal is a signal component for sensing a moving position of the lens unit and may include a frequency signal higher than the drive signal.

Herein, the prescribed time slot of the drive signal failing to be synthesized with the random high frequency signal may be synchronized with an OIS input time slot for applying an OIS (optical image stabilizer) signal.

For instance, the OIS signal is a signal for focus correction due to destabilization. When the OIS signal is applied, noise may be generated from an image due to a high frequency effect.

Therefore, the controller of the second embodiment of the present invention generates a second synchronization signal corresponding to an OIS signal input time slot for applying an OIS (optical image stabilizer) signal and is then able to synthesize a random high frequency signal in the rest of the time slot except the OIS input time slot in the whole time slot of a drive signal based on the generated second synchronization signal.

The controller of the second embodiment of the present invention does not synthesize a high frequency signal only in an OIS input time slot in the whole time slot of the drive signal but synthesizes a high frequency signal in the rest of the time slot, thereby minimizing noise in an image.

Figure 14:
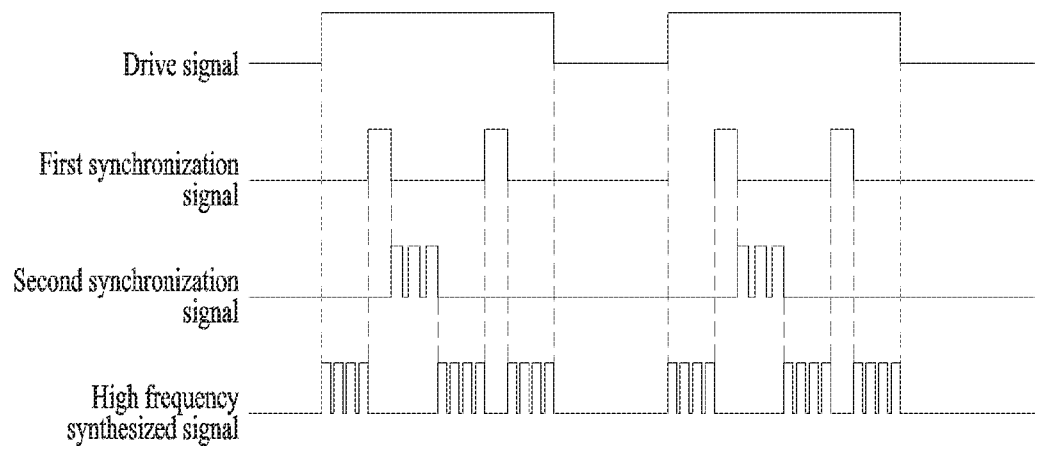

FIG. 14 is a diagram to describe a high frequency signal synthesizing method according to a third embodiment of the present invention.

Referring to FIG. 14, when a drive signal is applied to the lens unit, the controller may synthesize the drive signal with a random high frequency signal in the rest of time slot except a prescribed time slot of the device signal.

The drive signal is a signal component for moving the lens unit. And, the high frequency signal synthesized with the drive signal is a signal component for sensing a moving position of the lens unit and may include a frequency signal higher than the drive signal.

Herein, the prescribed time slot of the drive signal failing to be synthesized with the random high frequency signal may be synchronized with an image signal processing time slot of the image signal processing unit.

For instance, the image signal processing time slot may include an A/D conversion time slot for converting a received image signal into a digital signal from an analog signal.

Moreover, the prescribed time slot of the drive signal failing to be synthesized with the random high frequency signal may be synchronized with an OIS input time slot for applying an OIS (optical image stabilizer) signal.

For instance, the OIS signal is a signal for focus correction due to destabilization. When the OIS signal is applied, noise may be generated from an image due to a high frequency effect.

Therefore, the controller of the third embodiment of the present invention generates a first synchronization signal corresponding to an image signal processing time slot of the image signal processing unit and a second synchronization signal corresponding to an OIS signal input time slot for applying an OIS (optical image stabilizer) signal and is then able to synthesize a random high frequency signal in the rest of the time slot except the image signal processing time slot and the OIS input time slot in the whole time slot of a drive signal based on the generated first and second synchronization signals.

According to the third embodiment of the present invention, the controller does not synthesize a high frequency signal only in an image signal processing time slot and an OIS input time slot in the whole time slot of the drive signal but synthesizes a high frequency signal in the rest of the time slot, thereby minimizing noise in an image.

Figure 15:
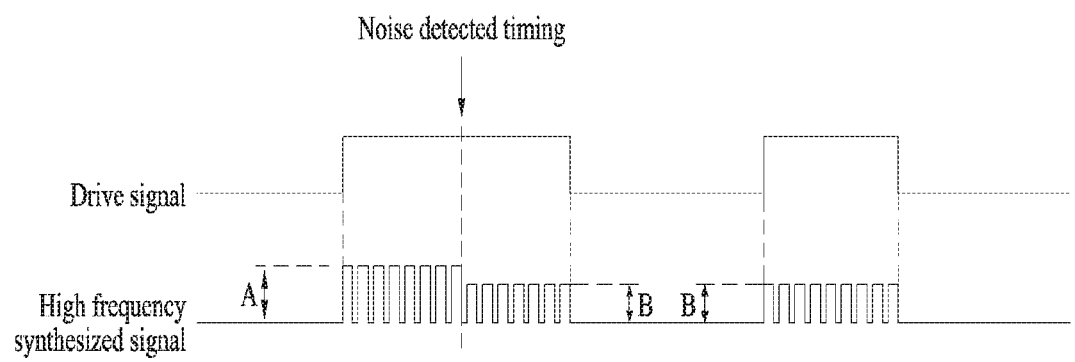

FIG. 15 is a diagram to describe a high frequency signal synthesizing method according to a fourth embodiment of the present invention.

Referring to FIG. 15, when a drive signal is applied to the lens unit, the controller may synthesize the drive signal with a random high frequency signal in the rest of time slot except a prescribed time slot of the device signal.

The drive signal is a signal component for moving the lens unit. And, the high frequency signal synthesized with the drive signal is a signal component for sensing a moving position of the lens unit and may include a frequency signal higher than the drive signal.

Herein, the prescribed time slot of the drive signal failing to be synthesized with the random high frequency signal may be synchronized with an image signal processing time slot of the image signal processing unit or an OIS input time slot for applying an OIS signal.

When the controller of the fourth embodiment of the present invention does not synthesize a high frequency signal in at least one of an image signal processing time slot and an OIS input time slot in the whole time slot of a drive signal but synthesizes a high frequency signal in the rest of the time slot, if noise is detected from an image, the controller can decrease an amplitude of the high frequency signal synthesized with the drive signal.

Namely, as shown in FIG. 15, in the course of applying a high frequency signal, which is synthesized with a drive signal, of a size of Amplitude A, the controller decreases an amplitude of the high frequency signal synthesized with the drive signal into a size of Amplitude B at a timing of detecting noise from an image, thereby minimizing the noise in the image.

In some cases, when a drive signal is applied to the lens unit, the controller may synthesize a random high frequency signal in the whole time slot of the drive signal.

In doing so, when the high frequency signal is synthesized in the whole time slot of the drive signal, if noise is detected from the image, the controller can decrease the amplitude of the high frequency signal synthesized with the drive signal, Namely, the controller decreases the amplitude of the high frequency signal synthesized with the drive signal, thereby minimizing noise in the image.

In the present invention, the driving signal includes a first and a second frequency signal. The first frequency signal of the drive signal includes a signal component for moving the lens unit, and the second frequency signal of the drive signal includes a signal component for sensing a movement position of the lens unit and includes a frequency signal higher than the first frequency signal.

The controller is configured to synthesize the second frequency signal with the first frequency signal only during a prescribed time slot of the first frequency signal when applying the drive signal to the moving coil.

Herein, a time slot of the first frequency signal not synthesized with the second frequency signal is in synchronization with a time slot of the processed image signal of the image signal processing unit.

The controller generates a synchronization signal corresponding to an image signal processing time slot of the image signal processing unit and synthesizes the second frequency signal in the rest of the time slot except the image signal processing time slot in the entire time slot of the first frequency signal based on the generated synchronization signal.

Also, the controller generates a synchronization signal corresponding to an OSI (optical image stabilizer) input time slot for applying an OIS signal and then synthesizes the second frequency signal in the rest of the time slot except the OIS input time slot in the entire time slot of the first frequency signal.

Also, the controller generates a first synchronization signal corresponding to an image signal processing time slot of the image signal processing unit, generates a second synchronization signal corresponding to an OIS (optical image stabilizer) input time slot for applying an OIS signal, and synthesizes the second frequency signal in the rest of the time slot except the image signal processing time slot and the OIS input time slot in the entire time slot of the first frequency signal based on the generated first and second synchronization signals.

Also, if noise is detected from the image signal processed by the image signal processing unit, the controller decreases amplitude of the second frequency signal synthesized with the first frequency signal.

Figure 16:
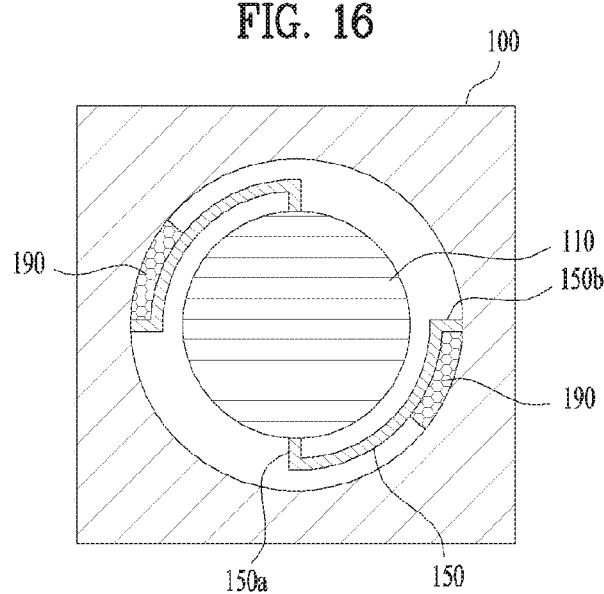
FIG. 16 is a layout of a spring shown in FIG. 1.

FIG. 16 is a layout of the spring shown in FIG. 1.

Figure 22:
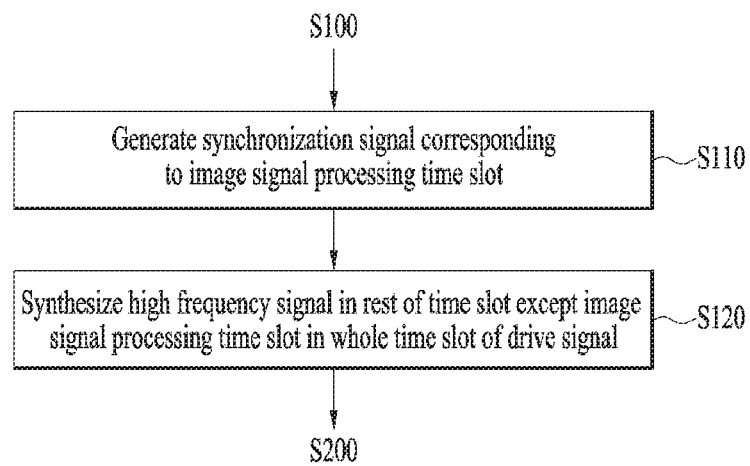

Referring to FIG. 22, the spring 150 is connected between the fixed unit 130 and the lens unit 110, thereby providing elastic force according to movement of the lens unit 110.

In this case, the spring 150 may include a first connecting part 150a connected to the lens unit 110 and a second connecting part 150b connected to the fixed unit 130.

Generally, as the spring 150 has the natural frequency, after the lens unit 110 has moved, it may cause a time loss for the lens unit 110 to wait for a prescribed time due to the natural frequency of the spring until being stabilized.

Hence, by disposing a damper 190 between the spring 150 and the fixed unit 130, it is able to suppress the natural oscillation of the spring.

In particular, a position of the damper 190 can be disposed in any region between the spring 150 and the fixed unit 130.

For instance, the damper 190 may be disposed adjacent to the second connecting part 150b connecting the spring 150 and the fixed unit 130.

Hence, by providing the damper between the spring 150 and the fixed unit 130, the natural oscillation of the spring 150 can be suppressed. By reducing hysteresis properties, error of auto focus can be prevented and auto focus time can be reduced.

Figure 17:
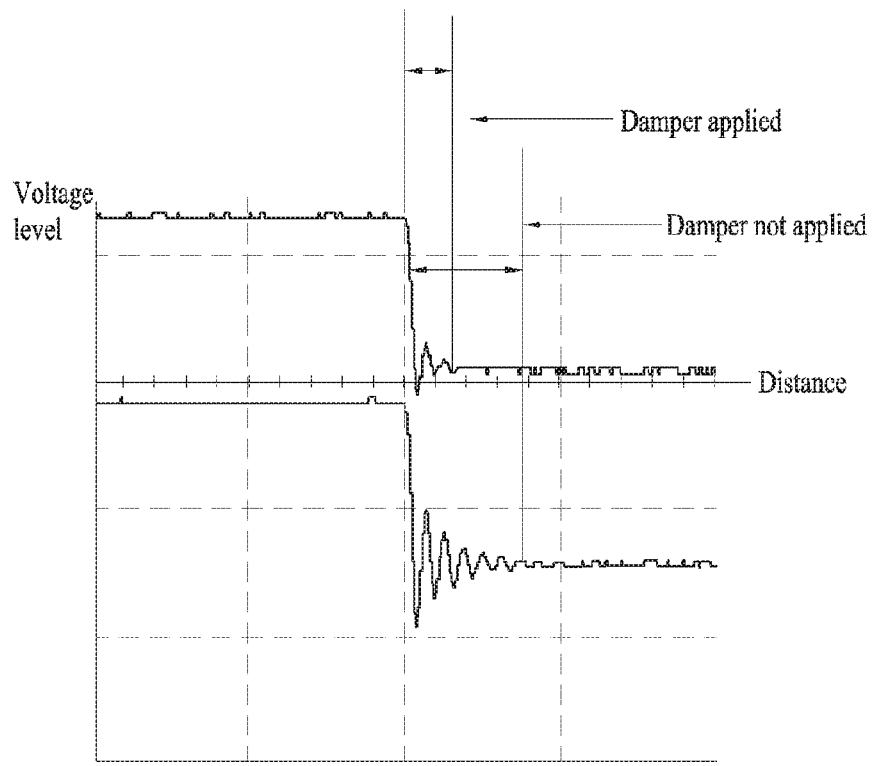
FIG. 17 is a graph to illustrate natural oscillation frequency characteristics before and after applying a damper of a spring.

FIG. 17 is a graph of natural oscillation frequency characteristics before and after applying a damper to a wiring.

Referring to FIG. 17, if a damper is not applied to a spring, after a movable unit has moved, it takes a long time until the movable unit is stabilized. Hence, an unnecessary time loss may be generated.

Yet, if a damper is applied to a spring, after the movable unit has moved, the movable unit is stabilized in a very short time. Hence, it is able to remove the unnecessary time loss to wait for the stabilization of the movable unit.

Therefore, by applying the damper to the wiring, the present invention suppresses the natural oscillation of the wiring. By reducing hysteresis properties, the present invention prevents error of auto focus and reduces auto focus time.

FIGS. 18 to 26 are flowcharts to describe a method of controlling an auto focus in a camera module according to the present invention.

Figure 18:
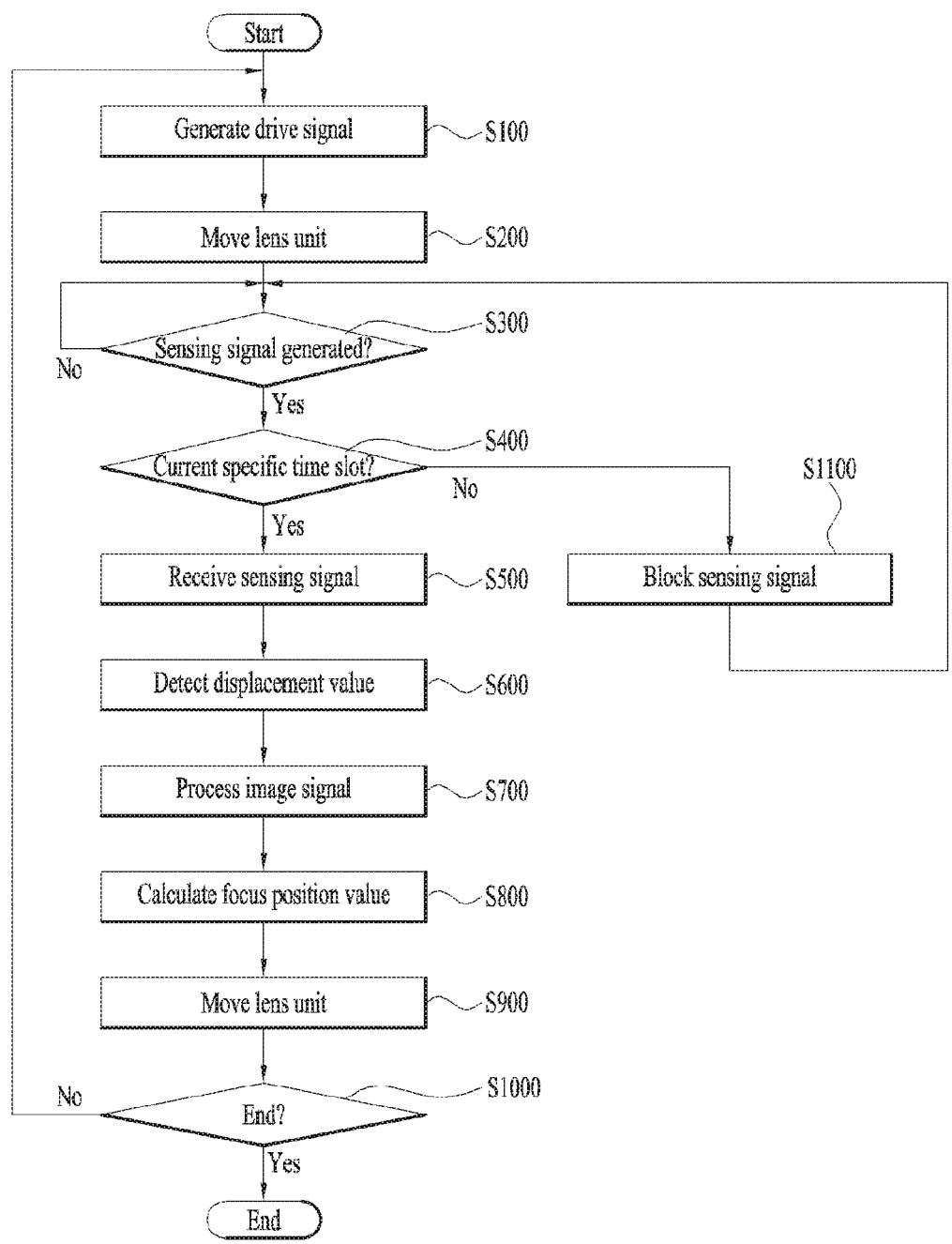
FIGS. 18 to 26 are flowcharts to describe a method of controlling an auto focus in a camera module according to the present invention.

Referring to FIG. 18, the controller generates a drive signal to apply to the lens unit [S100].

The controller moves the lens unit by applying the generated drive signal to the lens unit [S200].

The controller checks whether a sensing signal for sensing a movement of the lens unit is generated [S300].

If the sensing signal is generated, the controller can check whether a current time corresponds to a specific time slot [S400].

Herein, the specific time slot may include a time slot for applying the drive signal to the lens unit.

If it is the specific time slot, the controller receives the generated sensing signal [S500]. If it is not the specific time slot, the controller blocks the generated sensing signal [S1100].

The reason for this is to cut off noise generation due to such an external effect as an OIS signal input or the like.

Based on the received sensing signal, the controller detects a displacement value of a current or voltage depending on a distance between the fixed coil and the lens unit [S600].

Subsequently, the controller senses an image incident through the lens of the lens unit and then processes the sensed image signal [S700].

The controller calculates a focus position value of the lens unit from the processed image signal and the detected displacement value of the current or voltage [S800].

The controller moves the lens unit to the calculated focus position value [S900], checks whether it is a focus control end [S1000]. If it is the focus control end, the controller can end the entire focus control process.

Meanwhile, after the sensing signal has been generated, when the controller checks whether it is the specific time slot, if it is not the specific time slot, the controller blocks the generated sensing signal [S1100] and is able to generate and input an OIS (optical image stabilizer) signal.

Figure 19:
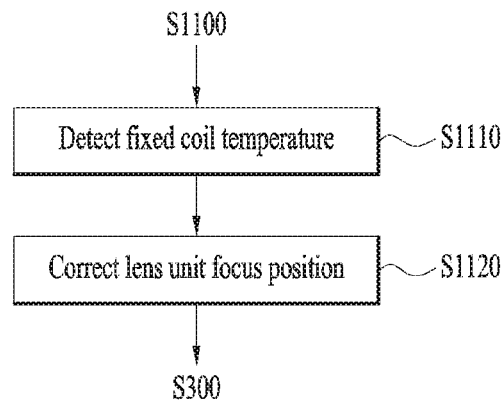

In some cases, as shown in FIG. 19, if the sensing signal is generated, when the controller checks whether it is the specific time slot, if it is not the specific time slot, the controller blocks the generated sensing signal [S1100], detects a temperature change of the fixed coil [S1110], and is then able to correct a focus position of the lens unit according to the detected temperature change of the fixed coil [S1120, whereby malfunction of auto focus can be prevented.

Figure 20:
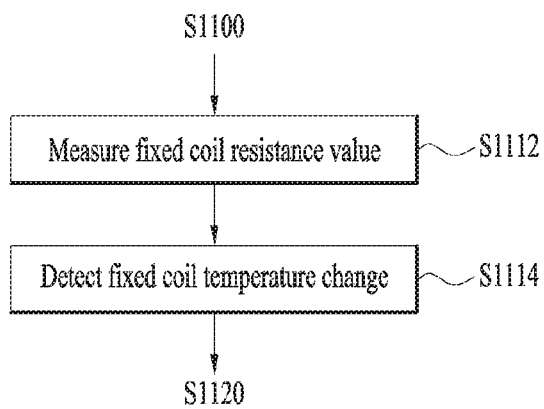

In doing so, as shown in FIG. 20, when the temperature change of the fixed coil is detected, the controller measures a resistance value of the fixed coil [S1112] and is then able to detect the temperature change of the fixed coil based on the measured resistance value [S1114].

Figure 21:
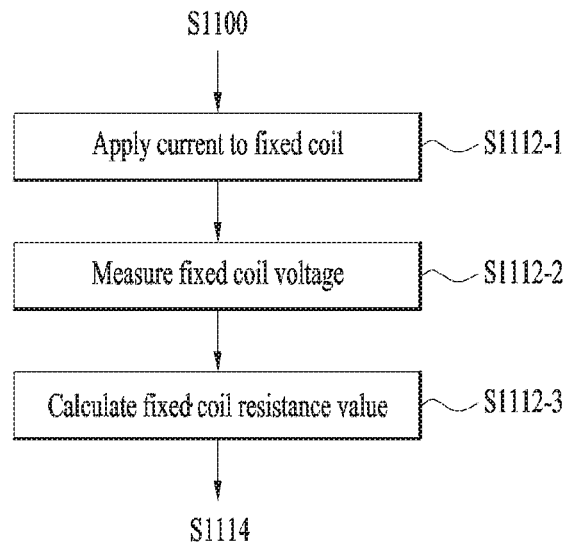

Moreover, when the controller measures the resistance value of the fixed coil, as shown in FIG. 21, the controller applies a current to the fixed coil [S1112-1], measures a voltage of the current applied fixed coil [S1112-2], and is then able to calculate the resistance value of the fixed coil based on the current value applied to the fixed coil and the measured voltage value [S1112-3].

In doing so, when the current is applied to the fixed coil, a timing for applying the current to the fixed coil may include a time slot between signal pulses sensed by the fixed coil.

Meanwhile, when the drive signal to be applied to the lens unit is generated [S100], the controller may synthesize the drive signal with a random high frequency signal.

Herein, the drive signal is a signal component for moving the lens unit. And, the high frequency signal synthesized with the drive signal is a signal component for sensing a moving position of the lens unit and may include a frequency signal higher than the drive signal.

Referring to FIG. 22, the controller generates a synchronization signal corresponding to an image signal processing time slot of the image signal processing unit [S110] and is then able to synthesize a random high frequency signal in the rest of the time slot except the image signal processing time slot in the whole time slot of the drive signal based on the generated synchronization signal [S120].

Namely, the controller does not synthesize a high frequency signal only in a drive signal time slot corresponding to an A/D conversion time slot for converting an image signal into a digital signal from an analog signal in the whole time slot of the drive signal but synthesizes a high frequency signal in the rest of the time slot, thereby minimizing noise in an image.

Figure 23:
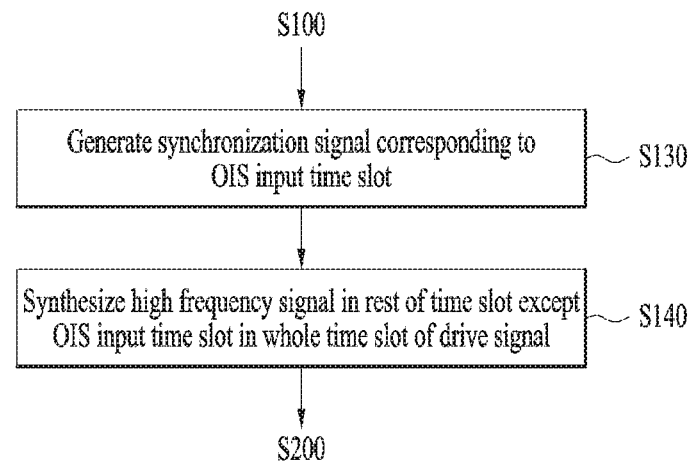

In some cases, as shown in FIG. 23, the controller generates a synchronization signal corresponding to an OIS input time slot for applying an OIS (optical image stabilizer) signal [S130] and is then able to synthesize a random high frequency signal in the rest of the time slot except the OIS input time slot in the whole time slot of the drive signal based on the generated synchronization signal [S140].

Namely, the controller does not synthesize a high frequency signal only in a drive signal time slot corresponding to an A/D conversion time slot for converting an image signal into a digital signal from an analog signal in the whole time slot of the drive signal but synthesizes a high frequency signal in the rest of the time slot, thereby minimizing noise in an image.

Herein, the OIS signal is a signal for focus correction due to destabilization (e.g., a shaking hand). Noise may be generated from an image by a high frequency signal when the OIS signal is applied.

Hence, the controller does not synthesize a high frequency signal in an OIS input time slot only in a whole time slot of a drive signal but synthesizes a high frequency signal in the rest of the time slot, thereby minimizing noise in an image.

Figure 24:
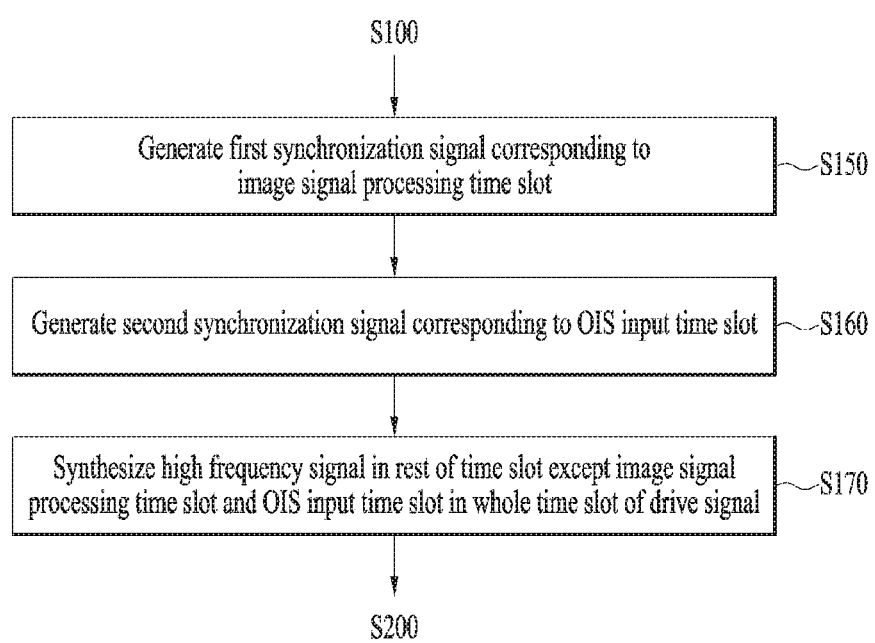

In some cases, as shown in FIG. 24, the controller generates a first synchronization signal corresponding to an image signal processing time slot of the image signal processing unit [S150], generates a second synchronization signal corresponding to an OIS input time slot for applying an OIS (optical image stabilizer) signal [S160], and may be then able to synthesize a random high frequency signal in the rest of the time slot except the image signal processing time slot and the OIS input time slot in the whole time slot of a drive signal based on the generated first and second synchronization signals [S170].

Namely, the controller does not synthesize a high frequency signal in an image signal processing time slot and an OIS input time slot only in a whole time slot of a drive signal but synthesizes a high frequency signal in the rest of the time slot, thereby minimizing noise in an image.

Figure 25:
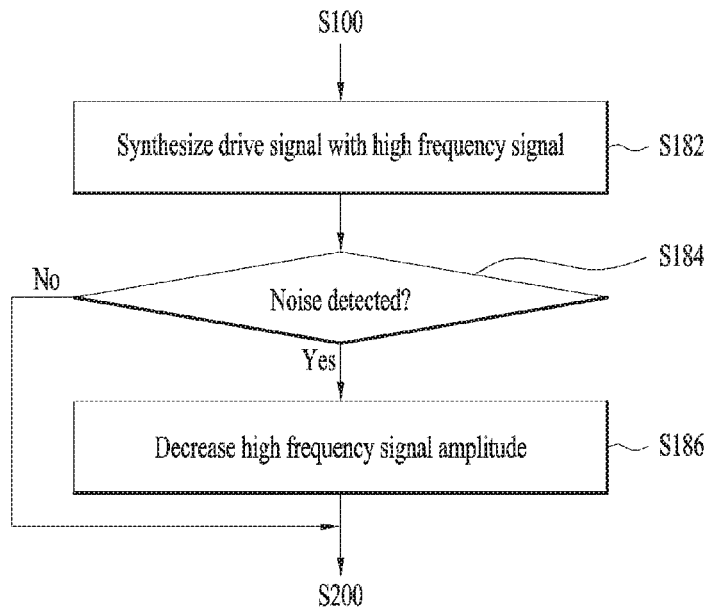

In some cases, as shown in FIG. 25, the controller synthesizes a random high frequency signal in the rest of the time slot except a prescribed time slot of the drive signal [S182], checks whether noise is detected from an image signal processed by the image signal processing unit [S184]. If the noise is detected, the controller can decrease amplitude of the high frequency signal synthesized with the drive signal [S186].

Namely, the controller decreases amplitude of a high frequency signal synthesized with a drive signal, thereby minimizing noise in an image.

In the present invention, the controller generates a drive signal by synthesizing a second frequency signal with a first frequency signal only during a prescribed time slot of the first frequency signal, moves the lens unit by applying the synthesized drive signal to the moving coil, sense an image incident on the lens unit based on the movement of the lens unit and detecting a displacement value of a current or voltage between the distance of the moving coil and the fixed coil, processes the sensed image signal during a time slot where the second frequency signal is not synthesized with the first frequency signal, in order to reduce noise included in the processed image signal, calculates a focus position value based on the processed image signal and the detected displacement value of the current or voltage, and moves the lens unit based on the calculated focus position value.

Herein, a time slot of the first frequency signal not synthesized with the second frequency signal is in synchronization with a time slot of the processed image signal.

The controller synthesizes the second frequency signal in the rest of the time slot except the image signal processing time slot in the entire time slot of the first frequency signal based on a synchronization signal generated corresponding to an image signal processing time slot.

Also, the controller generates a synchronization signal corresponding to an OSI (optical image stabilizer) input time slot for applying an OIS signal and then synthesizes the second frequency signal in the rest of the time slot except the OIS input time slot in the entire time slot of the first frequency signal.

Also, the controller generates a first synchronization signal corresponding to an image signal processing time slot of the image signal processing unit, generates a second synchronization signal corresponding to an OIS (optical image stabilizer) input time slot for applying an OIS signal, and synthesizes the second frequency signal in the rest of the time slot except the image signal processing time slot and the OIS input time slot in the entire time slot of the first frequency signal based on the generated first and second synchronization signals.

Also, if noise is detected from the image signal processed by the image signal processing unit, amplitude of the second frequency signal synthesized with the first frequency signal is decreased.

Figure 26:
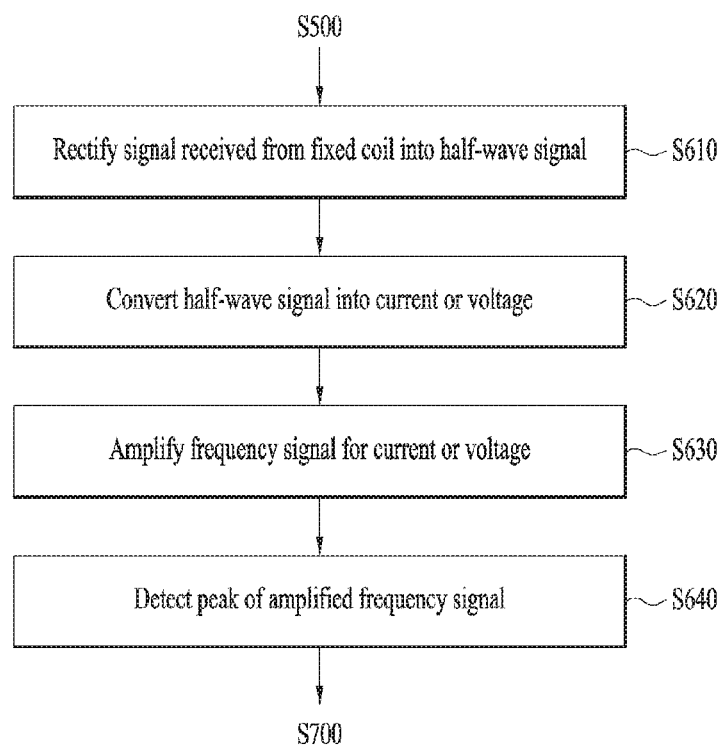

Meanwhile, referring to FIG. 26, in the step S600 of detecting a displacement value of a current or voltage according to a distance between the moving coil and the fixed coil, the half-wave rectifying unit of the detecting unit rectifies a frequency signal for a current or voltage received from the fixed coil [S610].

The converting unit of the detecting unit converts the rectified half-wave signal into a current or voltage [S620]. The amplifying unit of the detecting unit then amplifies a frequency signal for the converted current or voltage [S630].

Thereafter, the peak detecting unit of the detecting unit detects and outputs a peak of the amplified frequency signal, thereby detecting a displacement value of the current or voltage [S640].

Thus, the present invention blocks a sensing signal of the fixed coil 200, which is received in the rest of the time slot except a specific time slot, by disposing the switching unit 700, thereby implementing accurate auto focus by minimizing noise due to an OIS signal.

The present invention can prevent malfunction of an auto focus due to noise in a manner of performing an OIS signal generation and a temperature sensing of a fixed coil 200 in a time slot for cutting off a sensing signal.

The present invention can prevent malfunction of an auto focus due to a temperature change of a fixed coil 200 in a manner of correcting a focus position of a lens unit 110 by detecting a temperature change of the fixed coil 200.

The present invention can minimize noise caused to an image in a manner of synthesizing a random high frequency signal in the rest of time slot except an image signal processing time slot with respect to the whole time slot of a drive signal, thereby contributing to photo quality enhancement.

And, the present invention can achieve auto focus error prevention and auto focus time reduction in a manner of reducing natural oscillation of a spring 150 by disposing a damper between the spring 150 and a lens unit 110.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A mobile terminal capable of controlling an auto focus, the mobile terminal comprising:
   a fixed unit having a hole formed therein;
   a magnet placed inside the fixed unit;
   a lens unit including at least one lens and configured to move;
   a moving coil placed on the lens unit;
   a fixed coil;
   an image signal processing unit processing an image provided by a sensing unit; and
   a controller configured to:
   provide a first current or voltage signal to the moving coil, wherein a second current or voltage signal is induced to the fixed coil by electromagnetic induction between the moving coil and the fixed coil, the second current or voltage signal being varied according to a distance between the moving coil and the fixed coil;
   detect a temperature of the fixed coil; and
   determine a position of the lens unit for the auto focus based on the second current or voltage signal, the image processed by the image signal processing unit, and a difference between a reference temperature and the detected temperature of the fixed coil.

2. The apparatus of claim 1, wherein the controller is further configured to measure a resistance value of the fixed coil to detect the temperature of the fixed coil.

3. The apparatus of claim 2, wherein the controller is further configured to apply current to the fixed coil to measure a voltage of the fixed coil to measure the resistance value of the fixed coil based on the applied current and the measured voltage.

4. The apparatus of claim 3, wherein the controller is further configured to apply the current in between a signal pulse sensed from the fixed coil.

5. The apparatus of claim 1, wherein the controller is further configured to:
   measure a current position of the lens unit based on the second current or voltage signal induced to the fixed coil, and
   correct the current position of the lens unit based on the difference between the reference temperature and the detected temperature of the fixed coil.

6. The apparatus of claim 5, wherein the temperature of the fixed coil is detected in real time.

7. The apparatus of claim 1, wherein the first current or voltage signal includes a first frequency signal and a second frequency signal, wherein the first frequency signal is for moving the lens unit and the second frequency signal is for determining the position of the lens unit for the auto focus.

8. The apparatus of claim 7, wherein the second frequency signal has a frequency higher than the first frequency signal.

9. The apparatus of claim 1, wherein the fixed coil is disposed by being evenly spaced apart from one side of the lens unit and located on a line of a moving direction of the lens unit.

10. The apparatus of claim 1, wherein the sensing unit comprises an image sensor sensing the image incident through the at least one lens of the lens unit.

11. The apparatus of claim 1, wherein the fixed coil and the sensing unit are disposed either in a manner of being spaced evenly apart from one side of the lens unit or in a manner of opposing each other by leaving the lens unit in-between.

12. The apparatus of claim 1, the controller further comprises:
a detecting unit detecting the second current or voltage signal from the fixed coil; and
a calculating unit calculating the position of the lens unit for the auto focus based on the image processed by the image signal processing unit the second current or voltage signal from the detecting unit, and the temperature of the fixed coil.

13. The apparatus of claim 12, wherein the detecting unit comprises:
a half-wave rectifying unit rectifying a frequency signal for the second current or voltage signal sensed from the fixed coil into a half-wave signal;
a converting unit converting the half-wave signal received from the half-wave rectifying unit into a third current or voltage signal;
an amplifying unit amplifying a frequency signal for the third current or voltage signal converted by the converting unit; and
a peak detecting unit detecting a peak of the frequency signal amplified by the amplifying unit.

14. A method of controlling an auto focus of a mobile terminal, the method comprising:
moving a lens unit of the mobile terminal by applying a first current or voltage signal to a moving coil of the mobile terminal, wherein a second current or voltage signal is induced to a fixed coil of the mobile terminal by electromagnetic induction between the moving coil and the fixed coil, the second current or voltage signal being varied according to a distance between the moving coil and the fixed coil;
sensing an image incident on the lens unit according to the movement of the lens unit;
processing the sensed image;
detecting a temperature of the fixed coil;
determining a position of the lens unit for the auto focus based on the second current or voltage signal, the processed image, and a difference between a reference temperature and the detected temperature of the fixed coil.

15. The method of claim 14, further comprising measuring a resistance value of the fixed coil to detect the temperature of the fixed coil.

16. The method of claim 15, further comprising applying current to the fixed coil to measure a voltage of the fixed coil to measure the resistance value of the fixed coil based on the applied current and the measured voltage.

17. The method of claim 16, further comprising:
applying the current between a signal pulse sensed from the fixed coil.

18. The method of claim 14, wherein the determining of the position of the lens unit further comprises:
measuring a current position of the lens unit based on the second current or voltage signal induced to the fixed coil; and
correcting the current position of the lens unit based on the difference between the reference temperature and the detected temperature of the fixed coil.

19. The method of claim 18, further comprising:
rectifying a frequency signal for the second current or voltage signal received from the fixed coil into a half-wave signal;
converting the received half-wave signal into a third current or voltage signal;
amplifying a frequency signal for the third current or voltage signal; and
detecting a peak of the amplified frequency signal.

20. A method of controlling an auto focus of a camera module, the method comprising:
moving a lens unit of the camera module by applying a first current or voltage signal to a moving coil of the camera module, wherein a second current or voltage signal is induced to a fixed coil of the mobile terminal by electromagnetic induction between the moving coil and the fixed coil, the second current or voltage signal being varied according to a distance between the moving coil and the fixed coil;
sensing an image incident on the lens unit according to the movement of the lens unit;
processing the sensed image;
detecting a temperature of the fixed coil;
determining a position of the lens unit for the auto focus based on the second current or voltage signal, the processed image, and a difference between a reference temperature and the detected temperature of the fixed coil.

21. A camera module for an auto focus, the camera module comprising:
a fixed unit having a hole formed therein;
a magnet placed inside the fixed unit;
a lens unit including at least one lens and configured to move;
a moving coil placed on the lens unit;
a fixed coil;
an image signal processing unit processing an image provided by a sensing unit; and
a controller configured to:
provide a first signal to the moving coil, wherein a second signal is induced to the fixed coil by electromagnetic induction between the moving coil and the fixed coil, the second signal being varied according to a distance between the moving coil and the fixed coil,
detect a temperature of the fixed coil; and
determine a position of the lens unit for the auto focus based on the second current or voltage signal, the image processed by the image signal processing unit, and a difference between a reference temperature and the detected temperature of the fixed coil.

* * * * *